United States Patent
Aoki et al.

(10) Patent No.: US 10,031,224 B2
(45) Date of Patent: Jul. 24, 2018

(54) RADAR DEVICE, VEHICLE CONTROL SYSTEM, AND SIGNAL PROCESSING METHOD

(71) Applicant: FUJITSU TEN LIMITED, Kobe-shi, Hyogo (JP)

(72) Inventors: Shinya Aoki, Kobe (JP); Hisateru Asanuma, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 389 days.

(21) Appl. No.: 14/867,287

(22) Filed: Sep. 28, 2015

(65) Prior Publication Data

US 2016/0091603 A1 Mar. 31, 2016

(30) Foreign Application Priority Data

Sep. 30, 2014 (JP) .................. 2014-199811

(51) Int. Cl.
| | | |
|---|---|---|
| *G01S 13/93* | (2006.01) | |
| *G01S 7/03* | (2006.01) | |
| *G01S 7/35* | (2006.01) | |
| *G01S 13/34* | (2006.01) | |

(52) U.S. Cl.
CPC ............ *G01S 13/931* (2013.01); *G01S 7/032* (2013.01); *G01S 7/354* (2013.01); *G01S 13/345* (2013.01); *G01S 2013/9375* (2013.01)

(58) Field of Classification Search
CPC ............................... G01S 13/931; G01S 7/032
See application file for complete search history.

(56) References Cited

U.S. PATENT DOCUMENTS

| | | | | | |
|---|---|---|---|---|---|
| 5,471,214 | A | * | 11/1995 | Faibish | G01S 13/931 342/54 |
| 6,018,308 | A | * | 1/2000 | Shirai | G01S 7/412 342/118 |
| 6,404,328 | B1 | * | 6/2002 | Alland | G01S 7/411 340/435 |
| 6,492,935 | B1 | * | 12/2002 | Higuchi | G01S 13/931 342/54 |
| 6,583,403 | B1 | * | 6/2003 | Koike | G01S 13/931 250/221 |
| 6,812,882 | B2 | * | 11/2004 | Ono | G01S 13/34 342/114 |
| 8,558,733 | B2 | * | 10/2013 | Kamo | G01S 7/295 342/27 |
| 8,674,873 | B2 | * | 3/2014 | Shibata | G01S 13/345 342/118 |

(Continued)

FOREIGN PATENT DOCUMENTS

JP 2011221869 A 11/2011

*Primary Examiner* — Peter M Bythrow
(74) *Attorney, Agent, or Firm* — Oliff PLC

(57) ABSTRACT

A radar device which receives reflected waves from objects, and derives still targets, includes: a determining unit that determines whether any other still target exists at a position in the vicinity of a reference target which is a still target existing at a position closest to a position of a vehicle in a longitudinal direction; and a setting unit that makes it easy to determine the reference target as a roadblock, in a case where the number of other still targets existing at positions in the vicinity of the reference target is equal to or less than a predetermined value.

9 Claims, 21 Drawing Sheets

(56) References Cited

U.S. PATENT DOCUMENTS

| | | | | |
|---|---|---|---|---|
| 8,704,704 B2 * | 4/2014 | Luebbert | | G01S 13/343 342/104 |
| 9,721,471 B2 * | 8/2017 | Chen | | G08G 1/167 |
| 2003/0001771 A1 * | 1/2003 | Ono | | G01S 7/411 342/70 |
| 2003/0076255 A1 * | 4/2003 | Ono | | G01S 13/34 342/70 |
| 2007/0080850 A1 * | 4/2007 | Abe | | G01S 13/931 342/52 |
| 2009/0243912 A1 * | 10/2009 | Lohmeier | | G01S 7/4004 342/70 |
| 2012/0242531 A1 * | 9/2012 | Itoh | | G01S 7/4026 342/107 |
| 2012/0313811 A1 * | 12/2012 | Suzuki | | G01S 7/411 342/147 |
| 2013/0030687 A1 * | 1/2013 | Shida | | G01S 5/0072 701/301 |
| 2013/0038484 A1 * | 2/2013 | Ohkado | | G01S 13/345 342/70 |
| 2013/0307718 A1 * | 11/2013 | Aoki | | G01S 13/50 342/61 |
| 2014/0145871 A1 * | 5/2014 | Asanuma | | G01S 7/354 342/128 |
| 2014/0159948 A1 * | 6/2014 | Ishimori | | G01S 7/41 342/200 |
| 2014/0266855 A1 * | 9/2014 | Ikeya | | G01S 13/931 342/27 |
| 2014/0292558 A1 * | 10/2014 | Asanuma | | G01S 7/354 342/128 |
| 2014/0292559 A1 * | 10/2014 | Asanuma | | G01S 13/06 342/133 |
| 2014/0313070 A1 * | 10/2014 | Asanuma | | G01S 13/345 342/200 |
| 2015/0025770 A1 * | 1/2015 | Blake | | B60W 30/18163 701/93 |

* cited by examiner

RADAR DEVICE, VEHICLE CONTROL SYSTEM, AND SIGNAL PROCESSING METHOD

CROSS-REFERENCE TO RELATED APPLICATIONS

This application is based on and claims priority under 35 USC 119 from Japanese Patent Application No. 2014-199811 filed on Sep. 30, 2014, the entire disclosure of which is incorporated herein by reference.

BACKGROUND

1. Technical Field

The present invention relates to a process of deriving data on objects.

2. Related Art

In general, a radar device receives reflected waves from objects, and derives moving targets or still targets on the basis of the peak signals of the reflected waves. The radar device outputs target data on those targets to a data using device which uses the target data. The data using device is, for example, a vehicle control device which controls a vehicle. The vehicle control device controls behavior of the vehicle by using the target data acquired from the radar device, thereby providing safe and comfortable running to a user of the vehicle.

Also, if the radar device derives a still target existing in the running direction of the vehicle, it determines whether the still target is a roadblock to obstruct the progress of the vehicle. In a case where the still target is a roadblock such as a stopped vehicle, there is a possibility that the vehicle will collide with the roadblock. For this reason, in a case where the possibility that the still target is a roadblock is high, the radar device outputs target data on the still target to the vehicle control device. If acquiring the target data, the vehicle control device performs vehicle control such as deceleration on the vehicle, thereby avoiding collision of the vehicle with the roadblock.

In contrast, in a case where the possibility that the still target is a roadblock is low, the radar device does not output target data on the still target to the vehicle control device. Examples of still targets other than roadblocks from which the radar device derives include upper objects such as road signs and traffic lights installed over roadways, and roadblocks such as guardrails provided at the sides of roadways. Still targets such as upper objects do not have a risk of colliding with vehicles. Therefore, in a case where the possibility that a derived still target is not a roadblock is high, the radar device does not output target data on the corresponding still target to the vehicle control device.

Here, in order to determine whether each of derived still targets is a roadblock, for example, the radar device includes a first transmitting antenna which outputs a transmission wave upward with respect to the surfaces of roadways, and a second transmitting antenna which outputs a transmission wave downward with respect to the surfaces of roadways.

In this case, if transmission waves output from the first transmitting antenna and the second transmitting antenna are reflected from a still target, the radar device determines whether each still target is a roadblock, on the basis of the signal level difference between the reflected waves, the temporal transitions of the signal levels of the reflected waves, and the like. Also, as a technology related to the present invention, for example, there is Patent Literature (JP-A-2011-221869).

SUMMARY OF INVENTION

However, even if the signal levels of the reflected waves of a still target are signal levels based on a common reflection point, the signal levels may differ depending on the distance between the still target and the vehicle, and the difference between angles at which the transmission waves are reflected from the reflection point of the still target. For this reason, the radar device may be unable to accurately determine whether the still target is a roadblock, on the basis of the difference between the signal levels of the reflected waves and the temporal transitions of the signal levels of the reflected waves. As a result, the vehicle control device may not perform accurate vehicle control.

Illustrative aspect(s) of the present invention is to provide a technology for accurately determining whether each still target is a roadblock.

[1] An aspect of the present invention provides a radar device which receives reflected waves from objects, and derives still targets, including: a determining unit that determines whether any other still target exists at a position in the vicinity of a reference target which is a still target existing at a position closest to a position of a vehicle in a longitudinal direction; and a setting unit that makes it easy to determine the reference target as a roadblock, in a case where the number of other still targets existing at positions in the vicinity of the reference target is equal to or less than a predetermined value.

[2] The radar device according to [1], may have a configuration in which: in a case where the reference target exists in a range of a lane where the vehicle runs, if the number of other still targets existing in the ranges of adjacent lanes adjacent to the lane of the vehicle is equal to or less than the predetermined value, the setting unit makes it easy to determine the reference target as the roadblock.

[3] The radar device according to [1], may have a configuration in which: in a case where the reference target exists in the range of a lane where the vehicle runs, if the number of other still targets existing at positions apart from the position of the vehicle by a predetermined distance or more in the longitudinal direction is equal to or less than a predetermined value, the setting unit makes it easy to determine the reference target as a roadblock.

[4] The radar device according to [1], may have a configuration in which:
in a case where the number of other still targets is equal to or less than the predetermined value, the setting unit increases a value of a confidence level which is an index for determining whether the reference target is the roadblock, by a predetermined value.

[5] The radar device according to [1], may further include:
a detecting unit that detects still targets existing in a predetermined range including a plurality of lanes, wherein, only in a case where it is determined in a current process that the number of still targets existing in the predetermined range is equal to or less than a predetermined value, in a subsequent process, the determining unit performs the determination.

[6] The radar device according to [5], may further include:
an acquiring unit that acquires a speed of the vehicle, wherein, in a case where the speed of the vehicle where the radar device is provided is equal to or larger than a predetermined value, the detecting unit widens a width of the predetermined range.

[7] Another aspect of the present invention provides a radar device which receives reflected waves from objects, and derives still targets, and outputs target data items related to the still targets to a data using device which uses the target data items, including: a determining unit that determines whether any other still target exists at a position in the vicinity of a reference target which is a still target existing at a position closest to a position of a vehicle in a longitudinal direction; and an easing unit that eases an output condition for outputting a target data item related to the reference target to the data using device, in a case where the number of other still targets existing at positions in the vicinity of the reference target is equal to or less than a predetermined value.

[8] Another aspect of the present invention provides a vehicle control system including: the radar device according to [7]; and the data using device according to [7].

[9] Another aspect of the present invention provides a signal processing method of a radar device which receives reflected waves from objects, and derives still targets, including: determining whether any other still target exists at a position in the vicinity of a reference target which is a still target existing at a position closest to a position of a vehicle in a longitudinal direction; and making it easy to determine the reference target as a roadblock, in a case where the number of other still targets existing at positions in the vicinity of the reference target is equal to or less than a predetermined value.

According to [1] and [9], in a case where the number of other still targets existing at positions in the vicinity of the reference target is equal to or less than the predetermined value, the radar device can accurately determine whether each still target making it easy to determine the reference target as a roadblock is a roadblock.

According to [2], in a case where the number of other still targets existing in the ranges of adjacent lanes adjacent to the lane of the vehicle is equal to or less than the predetermined number, the radar device easily determines the reference target as a roadblock. Therefore, the radar device can accurately determine whether any other target belonging to the same object as that of the reference target exists in the ranges of the adjacent lanes.

According to [3], in a case where the number of other still targets existing in the ranges of adjacent lanes is equal to or less than the predetermined number, the radar device easily determines the reference target as a roadblock. Therefore, the radar device can accurately determine whether any other target belonging to the same object as that of the reference target exists in the range of the lane of the vehicle.

According to [4], by increasing the value of the confidence level, the radar device can surely determining that the reference target is a roadblock.

According to [5], only in a case where it is determined in the current process that the number of still targets existing in the predetermined range is equal to or less than the predetermined number, in the subsequent processes, the radar device performs the determination. Therefore, in a case where the number of still target data items to cause the radar device to erroneously determine roadblocks is relatively small, the radar device can perform a roadblock determining process, thereby accurately performing the determination.

According to [6], in a case where the speed of the vehicle is equal to or larger than the predetermined value, the radar device widens the width of the predetermined range. Therefore, the radar device can reduce a possibility that each still target data item which is not a roadblock will be determined as a data item on a roadblock, and can prevent control such as sudden braking to hinder the safety of a user of the vehicle.

According to [7], in a case where the number of other still targets existing at positions in the vicinity of the reference target is equal to or less than the predetermined value, the radar device eases the output condition for outputting the target data item on the reference target to the data using device. Therefore, the radar device can surely output target data items necessary for vehicle control to the vehicle control device.

According to [8], the vehicle control device can surely acquire target data items necessary for vehicle control, from the radar device, and can perform vehicle control to ensure the safety of the user of the vehicle.

DESCRIPTION OF EMBODIMENTS

Hereinafter, embodiments of the present invention will be described with reference to the accompanying drawings.

First Embodiment

<1. Block Diagram of System>

Figure 1:
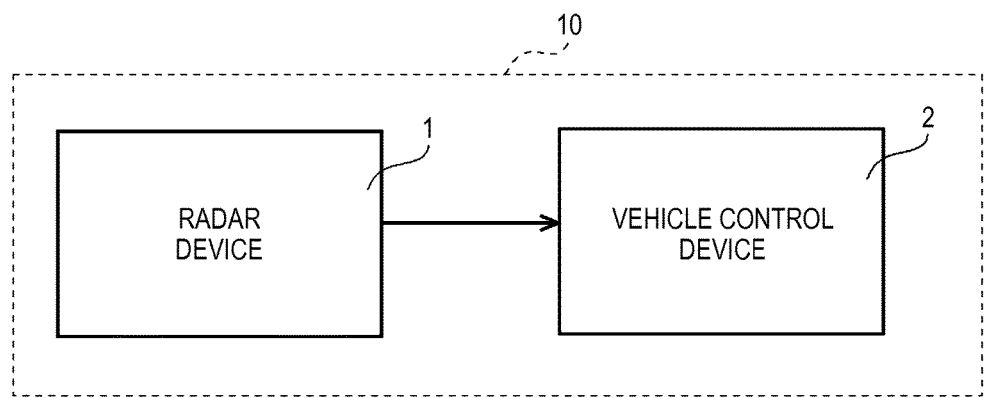
FIG. 1 is a view illustrating the configuration of a vehicle control system according to a first embodiment.

FIG. 1 is a view illustrating the configuration of a vehicle control system 10 according to a first embodiment. The vehicle control system 10 is installed in a vehicle such as a car. Hereinafter, the vehicle equipped with the vehicle control system 10 is referred to simply as the "vehicle". Also, the running direction of the vehicle is referred to as the front of the vehicle, and the opposite direction to the running direction is referred to as the rear of the vehicle. As shown in FIG. 1, the vehicle control system 10 includes a radar device 1 and a vehicle control device 2.

The radar device 1 of the present embodiment derives targets including moving targets and still targets existing around the vehicle by using frequency-modulated continuous waves (FM-CWs). A moving target is a target moving at a certain speed and having a relative speed different from the speed of the vehicle. Also, a still target is a target having a relative speed substantially equal to the speed of the vehicle.

Also, the radar device 1 derives target data items including target information items which are parameters, such as distances (hereinafter, referred to as "longitudinal distances") (in meters) by which reflected waves from objects move until they are received by receiving antennae of the radar device 1, the relative speeds (km/h) of the objects to the vehicle, and distances (hereinafter, referred to as "transverse distances") (in meters) of the objects from the vehicle in the left-right direction of the vehicle (the width direction of the vehicle), and outputs the target data items to the vehicle control device 2. As for transverse distances, the center position of the vehicle is set to 0 (zero), and transverse distances on the right side of the vehicle are expressed by positive values, and transverse distances on the left side of the vehicle are expressed by negative values.

The vehicle control device 2 is connected to a brake, a throttle, and the like of the vehicle, and acquires target data items output from the radar device 1, and controls behavior of the vehicle. Therefore, it can be said that the vehicle control device 2 is a data using device which uses target data items. For example, the vehicle control device 2 uses target data items acquired from the radar device 1 to decelerate the vehicle, thereby avoiding collision of the vehicle with roadblocks existing in the running direction of the vehicle, and protecting passengers of the vehicle. In this way, the vehicle control system 10 of the present embodiment acts as a pre-crash safety system (PCS).

<2. Block Diagram of Radar Device>

Figure 2:
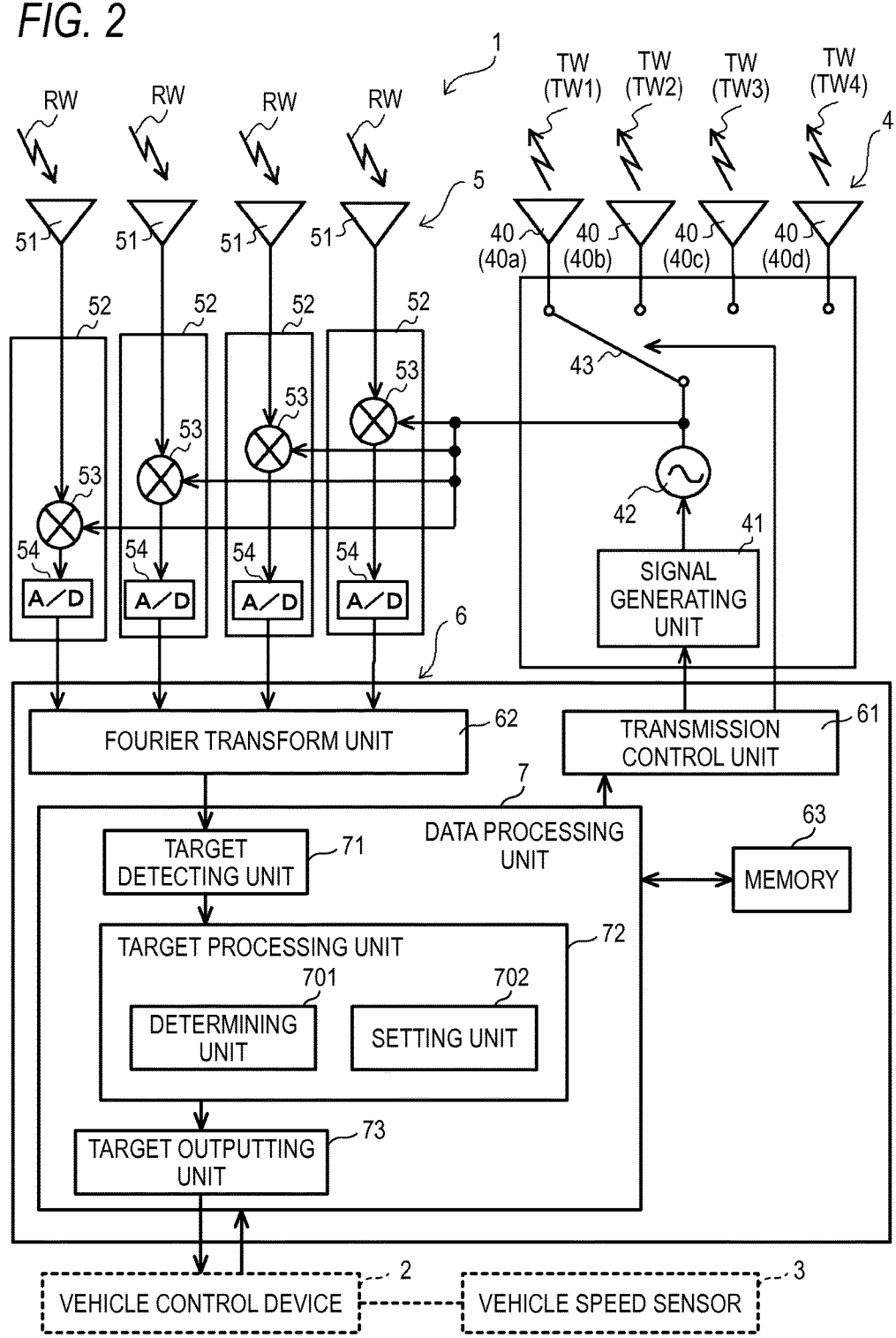
FIG. 2 is a view illustrating the configuration of a radar device.

FIG. 2 is a view illustrating the configuration of the radar device 1. The radar device 1 is installed, for example, inside a front grille of the vehicle, and outputs transmission waves to the outside of the vehicle, thereby receiving reflected waves from targets. Also, the radar device 1 mainly includes a transmitting unit 4, a receiving unit 5, and a signal processing device 6.

The transmitting unit 4 includes a signal generating unit 41, an oscillator 42, and a switch 43. The signal generating unit 41 generates a triangular wave signal for modulation, and supplies the triangular wave signal for modulation to the oscillator 42. The oscillator 42 is a voltage-controlled oscillator whose oscillation frequency is controlled by voltage. The oscillator 42 converts the triangular wave signal for modulation into a signal of a millimeter wave band (for example, 76.5 GHz), and outputs that signal to each transmitting antenna 40.

The switch 43 connects the oscillator 42 with any one of transmitting antennae 40a to 40d. The switch 43 is switched at predetermined timings (for example, at intervals of 5 msec) by control of a transmission control unit 61 to be described below. As a result, the transmitting antennae 40 for output the transmission waves are switched by the switch 43.

The transmitting antennae 40 are antennae which output the transmission waves TW to the outside of the vehicle on the basis of a transmission signal. The transmitting antennae 40 are composed of four transmitting antennae 40a to 40d. The transmitting antennae 40a to 40d output the transmission waves TW1 to TW4, and are switched at a predetermined cycle by switching of the switch 43. Like this, the transmission waves TW are sequentially output from any one transmitting antenna of the four transmitting antennae by switching of the switch 43.

The receiving unit 5 includes a plurality of receiving antenna 51 which forms an array antenna, and a plurality of individual receiving units 52 connected to the plurality of receiving antennae 51. In the present embodiment, the receiving unit 5 includes, for example, four receiving antennae 51 and four individual receiving units 52. The four individual receiving units 52 correspond to the four receiving antennae 51, respectively. Each receiving antenna 51 receives reflected waves RW from targets, and each individual receiving unit 52 processes a reception signal acquired by a corresponding receiving antenna 51.

Each individual receiving unit 52 includes a mixer 53 and an A/D converter 54. A reception signal which is acquired from reflected waves RW received by each receiving antenna 51 is amplified by a low-noise amplifier (not shown) and then is transmitted to a corresponding mixer 53. The corresponding mixer 53 mixes the reception signal and a transmission signal which is input from the oscillator 42 of the transmitting unit 4. As a result, a beat signal having a beat frequency which is the difference between the frequency of the transmission signal and the frequency of the reception signal is generated. The beat signal generated by the mixer 53 is converted into a digital signal by a corresponding A/D converter 54, and then is output to the signal processing device 6.

The signal processing device 6 includes a micro computer, which includes a CPU, a memory 63, and so on. The signal processing device 6 stores a variety of data which are operands, target data items which a data processing unit 7 derives, and so on, in the memory 63 which is a storage unit. Examples of the memory 63 include a RAM. The signal processing device 6 includes the transmission control unit 61, a Fourier transform unit 62, and the data processing unit 7, as functions which are implemented in a software wise by the micro computer. The transmission control unit 61 controls the signal generating unit 41 of the transmitting unit 4, and controls switching of the switch 43.

The Fourier transform unit 62 performs fast Fourier transform (FFT) on the beat signal output from each of the plurality of individual receiving units 52. In this way, the Fourier transform unit 62 converts the beat signal related to the reception signal of each of the plurality of receiving antennae 51, into a frequency spectrum which is a frequency domain data item. Each frequency spectrum acquired by the Fourier transform unit 62 is output to the data processing unit 7.

The data processing unit 7 derives target data items on the basis of the frequency spectrum of each of the plurality of receiving antennae 51. The data processing unit 7 outputs the derived target data items to the vehicle control device 2.

The data processing unit 7 includes a target detecting unit 71, a target processing unit 72, and a target outputting unit 73. The target detecting unit 71 detects target data items on the basis of the frequency spectra acquired by the Fourier transform unit 62. The target processing unit 72 performs various processes, such as a continuity determining process (to be described below), a filter process, and a roadblock determining process, on the detected target data items. The target processing unit 72 includes a determining unit 701 and a setting unit 702.

The determining unit 701 determines whether any still target exists at the shortest distance position in the longitudinal distance in the lane of the vehicle, on the basis of the target data items detected by the target detecting unit 71. If a still target exists at the shortest distance position in the longitudinal distance in the lane of the vehicle, the corresponding still target is considered as a "reference target". In this case, the determining unit 701 also determines whether any other still target than the reference target exists at a position in the vicinity of the reference target.

In a case where the number of other still targets existing at positions in the vicinity of the reference target is equal to or less than a predetermined number, the setting unit 702 makes it easy to determine the reference target as a roadblock. Detailed contents of processes of the determining unit 701 and the setting unit 702 will be described below.

The target outputting unit 73 outputs target data items processed by the target processing unit 72, to the vehicle control device 2.

<3. Antenna Configuration>

Figure 3:
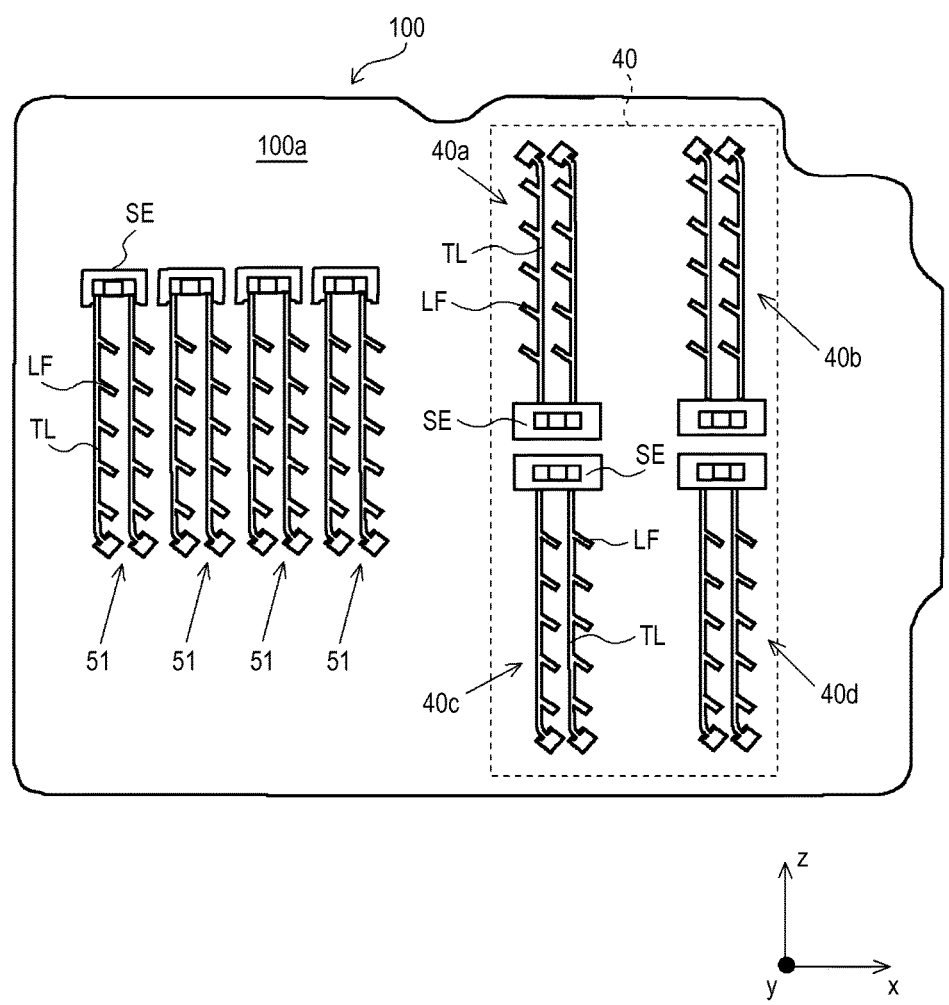
FIG. 3 is a view illustrating an antenna configuration.

Subsequently, the configuration of an antenna 100 equipped with the transmitting antennae 40 and the receiving antennae 51 of the radar device 1 will be described. FIG. 3 is a view illustrating the configuration of the antenna 100. In the following description, directions of FIG. 3 refer to the directions when the radar device 1 is mounted on the vehicle. More specifically, a vertical direction relative to the surface of a roadway (a vehicle height direction of the vehicle) is a z axis direction of FIG. 3, and a left-right direction relative to the surface of a roadway (a vehicle width direction of the vehicle) is an x axis direction of FIG. 3, and a front-rear direction relative to the surface of a roadway (the running direction of the vehicle) is a y axis direction of FIG. 3. In the present embodiment, the positive z direction is oriented upward with respect to the surface of a roadway, and the positive x direction is oriented leftward with respect to the surface of a roadway, and the positive y direction is oriented rearward with reference to the surface of a roadway. Also, the negative z direction is oriented downward with respect to the surface of a roadway, and the negative x direction is oriented rightward with respect to the surface of a roadway, and the negative y direction is oriented forward with reference to the surface of a roadway.

The antenna 100 has the transmitting antennae 40 and the receiving antennae 51 on a board surface of a dielectric board 100a.

The transmitting antennae 40 are composed of the four transmitting antennae 40a to 40d. The transmitting antennae 40a to 40d are disposed such that their longitudinal directions are parallel to a vertical direction (parallel to the z axis direction). Also, the transmitting antennae 40a to 40d have a configuration in which two pairs of transmitting antennae are disposed in two stages in a vertical direction (parallel to the z axis direction), respectively, and each pair of transmitting antennae are disposed side by side in a left-right direction (parallel to the x axis direction). In short, the transmitting antennae 40a to 40d are disposed in a two-by-two matrix such that their longitudinal directions are parallel to a vertical direction.

Also, each of the transmitting antennae 40a to 40d has two transmission line TL connected to a power supply port SE, and on each transmission line TL, a plurality of antenna elements LF is provided. The transmission lines TL receive transmission signals from the power supply ports SE, and transmit those signals to the antenna elements LF. Also, according to the interval between each antenna element LF and another antenna element LF provided on each transmission line, and the like, the output direction of a transmission wave based on the transmission signal is set.

The receiving antenna 51 are composed of four receiving antennae 51. The individual receiving antennae 51 are disposed side by side in a left-right direction (parallel to the x axis direction) such that their longitudinal directions are parallel to the vertical direction (the z axis direction). Also, each receiving antenna 51 has two transmission lines TL connected to a power supply port SE, and on each transmission line TL, a plurality of antenna elements LF is provided. The antenna elements of the receiving antennae 51 receive reflected waves, and transmit reception signals to the power supply ports SE through the transmission lines TL.

<4. Transmission Ranges>

Figure 4:
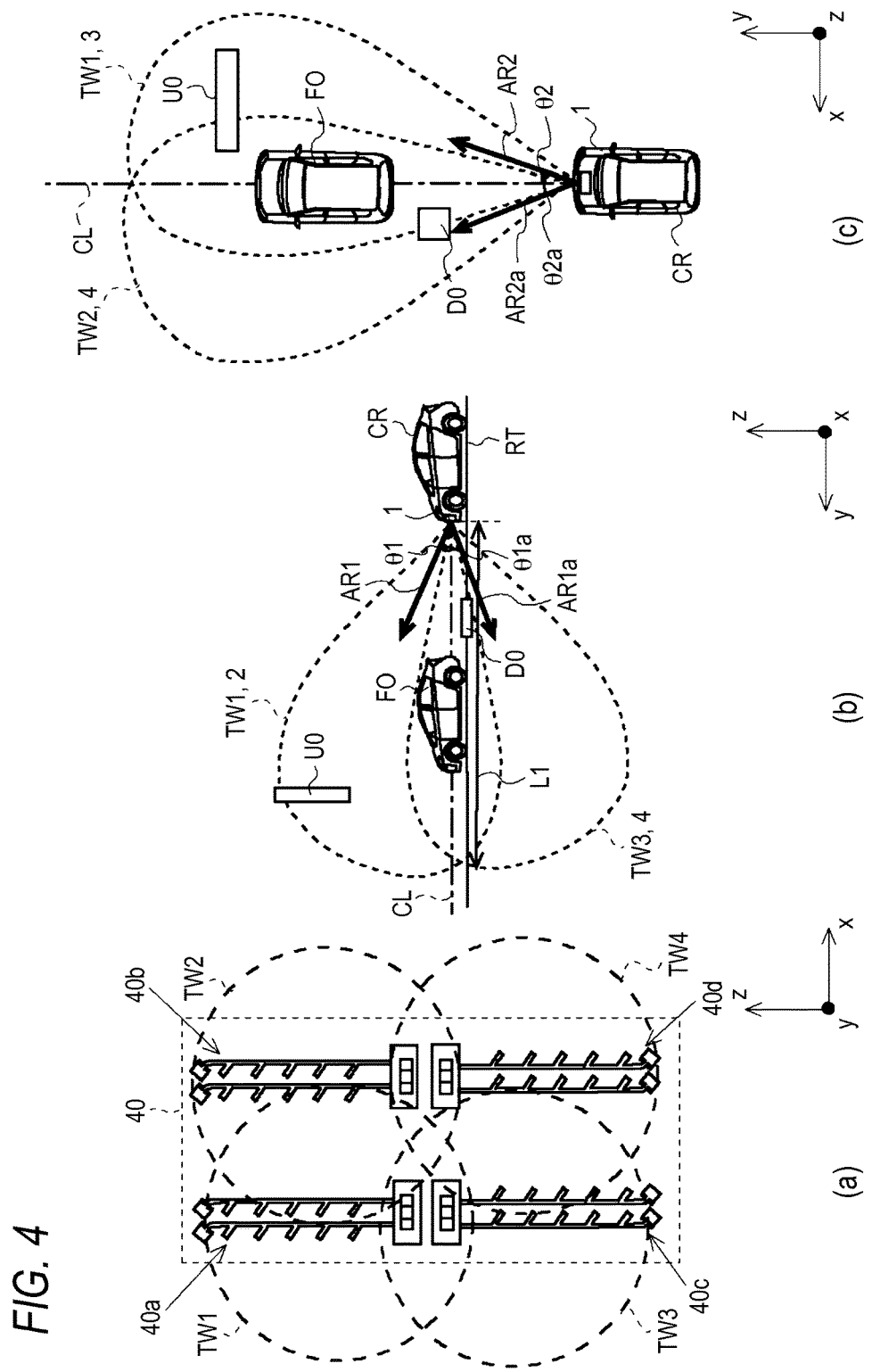
FIG. 4 includes views for explaining the transmission ranges of transmission waves.

Subsequently, the transmission ranges of the transmission waves which are output from the transmitting antennae 40a to 40d will be described. FIG. 4 includes views for explaining the transmission ranges of the transmission waves. First, the transmission ranges of the transmission waves as seen from the front side of the vehicle in the running direction will be described.

Part (a) of FIG. 4 is a view illustrating the transmitting antennae 40 as seen from the front side (the negative y direction) with respect to a roadway surface. From the transmitting antennae 40a to 40d, the transmission waves TW1 to TW4 having predetermined transmission ranges are sequentially output. As for the transmission ranges of the transmission waves TW1 to TW4, the transmission ranges of transmission waves which are output from neighboring transmitting antennae partially overlap.

Subsequently, the transmission ranges of the transmission waves TW1 to TW4 as seen from one side of the vehicle CR will be described. Part (b) of FIG. 4 is a view illustrating the transmission waves TW1 to TW4 as seen from the left side (the negative x direction) relative to a roadway surface RT. As shown in Part (b) of FIG. 4, the transmission waves TW1 and TW2 are output upward (the positive Z direction) relative to the roadway surface RT, and the transmission waves TW3 and TW4 are output downward (the negative Z direction) relative to the roadway surface RT. Specifically, the transmission waves TW1 and TW2 are output in a direction shown by an arrow AR1, that is, obliquely upward with respect to the roadway surface RT.

If a virtual straight line CL (hereinafter, referred to as the "horizontal axis CL") extends forward from the radar device 1 in a horizontal direction parallel to the roadway surface RT, such that the angle of the horizontal axis CL to the roadway surface RT is ±0°, the angle of the arrow AR1 becomes θ1° (for example, +5°) toward a vertical direction with respect to the horizontal axis CL. Also, the transmission waves TW3 and TW4 are output in a direction shown by an arrow AR1a, that is, obliquely downward with respect to the roadway surface RT. The angle of the arrow AR1a becomes θ1a° (for example, −5°) toward a vertical direction with respect to the horizontal axis CL.

As described above, the transmission range of the transmission wave TW1 and the transmission range of the transmission wave TW3 are substantially vertically symmetrical with respect to the horizontal axis CL. Also, the transmission range of the transmission wave TW2 and the transmission range of the transmission wave TW4 are substantially vertically symmetrical with respect to the horizontal axis CL. As a result, the radar device 1 having the transmitting antennae 40 can include all targets different in height from the roadway surface RT in the vertical direction, that is, stopped vehicles FO which are roadblocks, traffic signs UO which are upper objects, and traffic buttons DO which are lower objects, in the transmission ranges, and detect them.

Also, if the position of the vehicle CR is set to 0 m, the distance of the leading end of the transmission range of each of the transmission waves TW1 to TW4 from the position of the vehicle CR, that is, a longitudinal distance L1 in which reflected waves from targets can be received is, for example, 180 m, and the angle range of each transmission range in a vertical direction is, for example, 12°.

Subsequently, the transmission ranges of the transmission waves TW1 to TW4 as seen from above the vehicle CR will be described. Part (c) of FIG. 4 is a view illustrating the transmission ranges of the transmission waves TW1 to TW4 as seen from above the roadway surface RT (from the positive Z direction). As shown in Part (c) of FIG. 4, the transmission waves TW1 and TW3 are output toward the right (the negative x direction) with respect to the roadway surface RT, and the transmission waves TW2 and TW4 are output toward the left (the positive x direction) with respect to the roadway surface RT. Specifically, the transmission waves TW1 and TW3 are output in a direction shown by an arrow AR2, that is, obliquely rightward with respect to the roadway surface RT. In a case where the angle of the horizontal axis CL to the roadway surface RT in a horizontal direction is set to ±0°, the angle of the arrow AR2 to the horizontal axis CL in a horizontal direction becomes 82° (for example, +7°). Also, the transmission waves TW2 and TW4 are output in a direction shown by an arrow AR2a, that is, obliquely leftward with respect to the roadway surface RT. The angle of the arrow AR2a to the horizontal axis CL in a horizontal direction becomes θ2a° (for example, −7°).

As described above, the transmission range of the transmission wave TW1 and the transmission range of the transmission wave TW2 are substantially bilaterally symmetrical with respect to the horizontal axis CL. Also, the transmission range of the transmission wave TW3 and the transmission range of the transmission wave TW4 are substantially bilaterally symmetrical with respect to the horizontal axis CL. As a result, the radar device 1 having the transmitting antennae 40 can include all targets different in horizontal distance, that is, stopped vehicles FO, traffic signs UO, and traffic buttons DO, in the transmission ranges, and detect them. Also, the angle range of the transmission range of each of the transmission waves TW1 to TW4 in a horizontal direction is, for example, 25°.

As described above, the transmitting antenna 40a outputs a transmission wave toward the upper right side with respect to the roadway surface RT, and the transmitting antenna 40b outputs a transmission wave toward the upper left side with respect to the roadway surface RT, and the transmitting antenna 40c outputs a transmission wave toward the lower right side with respect to the roadway surface RT, and the transmitting antenna 40d outputs a transmission wave toward the lower left side with respect to the roadway surface RT.

<5. Calculation of Target Information>

Now, a method (principle) by which the radar device 1 calculates target information items including the longitudinal distances and relative speeds of targets will be described.

Here, a target information item is information including a plurality of parameters which are target data items such as a longitudinal distance, transverse distance, and a relative speed.

Figure 5:
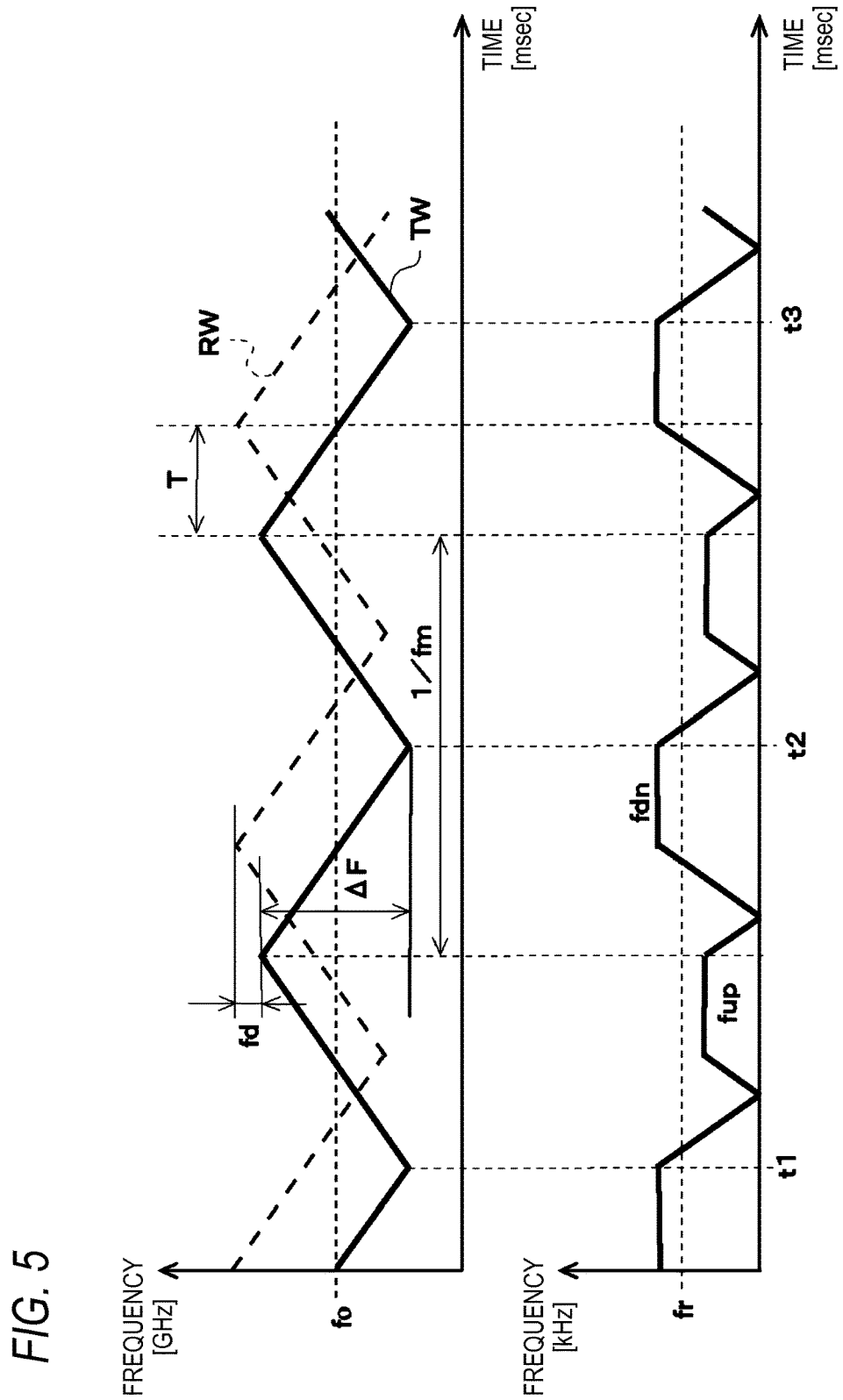
FIG. 5 is a view illustrating the relation between a transmission wave and a reflected wave.

FIG. 5 is a view illustrating the relation between a transmission wave TW and a reflected wave RW. In order to simplify the explanation, the reflected wave RW shown in FIG. 5 is considered as a reflected wave from one ideal target. In FIG. 5, the transmission wave TW is shown by a solid line, and the reflected wave RW is shown by a broken line. Also, in the upper portion of FIG. 5, the vertical axis represents frequency in GHz, and the horizontal axis represents time in microseconds. Also, with reference to FIG. 5, two transmission waves, that is, the transmission wave TW1 which is output toward the upper right side with respect to the roadway surface RT, and the transmission wave TW3 which is output toward the lower right side with respect to the roadway surface RT will be described as examples. On the assumption that the transmission wave TW1 is output in a section from a time t1 to a time t2, and the transmission wave TW3 is output in a section from the time t2 to a time t3, the following description will be made.

As shown in FIG. 5, the transmission wave TW is a continuous wave whose frequency increases and decreases in a predetermined cycle with a predetermined frequency as the center. The frequency of the transmission wave TW changes linearly with respect to time. Hereinafter, a section in which the frequency of the transmission wave TW increases will be referred to as an "up section", and a section in which the frequency of the transmission wave TW decreases will be referred to as a "down section". Also, the center frequency of the transmission wave TW is represented by fo, and the change width of the frequency of the transmission wave TW is represented by ΔF, and the inverse number of one cycle in which the frequency of the transmission wave TW increases and decreases is represented by fm.

The reflected wave RW is a reflected wave of the transmission wave TW from a target, and thus is a continuous wave whose frequency increases and decreases in a predetermined cycle with a predetermined frequency as the center. However, in the reflected wave RW, a time delay of a time T relative to the transmission wave TW occurs. This delay time T depends on the distance (longitudinal distance) of the target from the vehicle, and can be expressed by the following Expression 1 when the speed of light (the speed of electric waves) is represented by "c".

$$T = \frac{2 \cdot R}{c} \qquad \text{[Expression 1]}$$

Also, in the reflected wave RW, a frequency shift of a frequency fd relative to the transmission wave TW occurs due to the Doppler effect according to the relative speed V of the target to the vehicle CR.

As described above, with respect to the transmission wave TW, in the reflected wave RW, the time delay according to the longitudinal distance and the frequency shift according to the relative speed occur. As a result, as shown in the lower portion of FIG. 5, the beat frequency (the difference frequency between the frequency of the transmission wave TW and the frequency of the reflected wave RW) of a beat signal which is generated by a mixer 53 differs between up sections and down sections. Hereinafter, the beat frequency of the up sections is represented by fup, and the beat frequency of the down sections is represented by fdn. Also, in the lower portion of FIG. 5, the vertical axis represents frequency in kHz, and the horizontal axis represents time in microseconds.

Here, if the beat frequency in a case where the relative speed of the target is 0 (zero) (a case where there is no frequency shift attributable to the Doppler effect) is represented by fr, the beat frequency fr can be expressed by the following Expression $$fr = \frac{fup + fdn}{2} \quad \text{[Expression 2]}$$

This frequency fr becomes a value according to the above described delay time T. As a result, the longitudinal distance R of the target can be obtained by the following Expression 3 using the frequency fr.

$$R = \frac{c}{4 \cdot \Delta F \cdot fm} fr \quad \text{[Expression 3]}$$

Also, the frequency fd by which the frequency shift occurs due to the Doppler effect can be expressed by the following Expression 4.

$$fd = \frac{fup - fdn}{2} \quad \text{[Expression 4]}$$

The relative speed V of the target can be obtained by the following Expression 5 using the frequency fd.

$$V = \frac{c}{2 \cdot fo} fd \quad \text{[Expression 5]}$$

In the above description, the longitudinal distance and relative speed of one ideal target have been obtained. However, in reality, the radar device 1 simultaneously receives reflected waves RW from a plurality of targets existing in front of the vehicle CR. Therefore, the frequency spectrum which the Fourier transform unit 62 obtains by performing FFT on the beat signals acquired from the reception signals include information on the plurality of targets.

<4. Frequency Spectrum>

Figure 6:
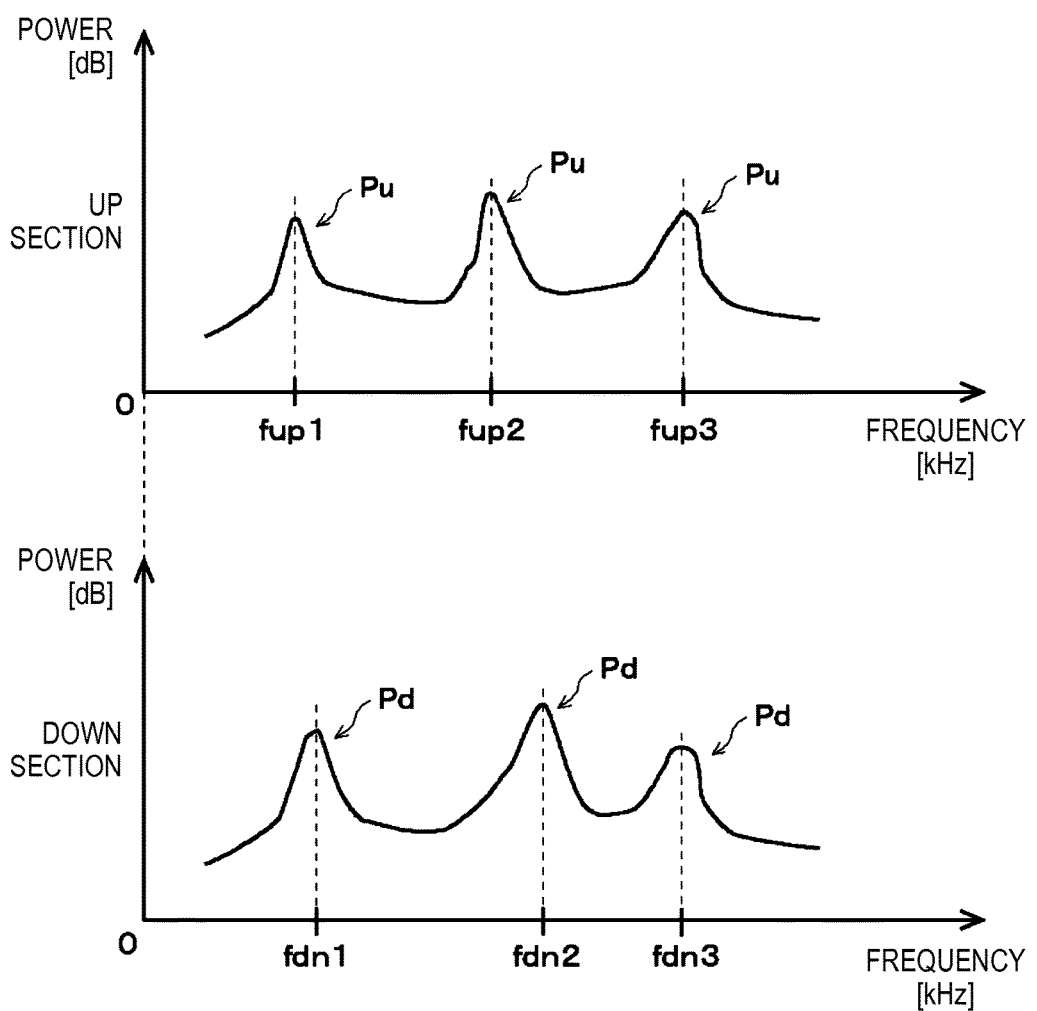
FIG. 6 is a view illustrating examples of frequency spectra.

FIG. 6 is a view illustrating examples of this frequency spectrum. The upper portion of FIG. 6 shows a frequency spectrum in an up section, and the lower portion of FIG. 6 shows a frequency spectrum in a down section. In FIG. 6, each vertical axis represents signal power in dB, and each horizontal axis represents frequency in kHz.

In the frequency spectrum of an the up section shown in the upper portion of FIG. 6, at the positions of three frequencies fup1, fup2, and fup3, peaks Pu are shown, respectively. Also, in the frequency spectrum of the down section shown in the lower portion of FIG. 6, at the positions of three frequencies fdn1, fdn2, and fdn3, peaks Pd are shown, respectively. Hereinafter, the frequency will also be represented in another unit of bin. 1 bin corresponds to about 467 Hz, and corresponds to about a longitudinal distance of 0.36 m.

Only if relative speeds are considered, frequencies at which peaks are shown in each frequency spectrum correspond to the longitudinal distances of targets as described above. For example, if the frequency spectrum of the up section is paid attention, at positions apart by longitudinal distances corresponding to the three frequencies fup1, fup2, and fup3 at which the peaks Pu are shown, targets exist, respectively.

Therefore, the target detecting unit 71 (see FIG. 2) extracts the frequencies at which peaks Pu and Pd having power exceeding a predetermined threshold value, from the frequency spectra of both of the up section and the down section. Hereinafter, the frequencies which are extracted as described above will be referred to as the "peak frequencies".

The frequency spectra of both of the up section and the down section as shown in FIG. 6 are obtained from the reception signal of one receiving antenna 51. Therefore, the Fourier transform unit 62 extracts the frequency spectra of both of an up section and a down section as shown in FIG. 6, from each of the reception signals of the four receiving antennae 51.

Since the four receiving antennae 51 receive reflected waves RW from common reflection points, the peak frequencies which are extracted from the frequency spectra of the four receiving antennae 51 are the same as one another. However, since the positions of the four receiving antennae 51 are different, the phases of the reflected waves RW differ depending on the receiving antennae 51. Therefore, phase information items of the reception signals having the same bin differ depending on the receiving antennae 51.

Also, in a case where a plurality of targets exists at different angles at the same bin, information items on the plurality of targets are included in one peak frequency signal. For this reason, the target detecting unit 71 separates the plurality of targets existing at the same bin, according to angular directions, from the one peak frequency signal, by an azimuth calculating process, thereby estimating the angles of the targets.

Specifically, the target detecting unit 71 focuses on the reception signals of the four receiving antennae 51, and estimates the angles of the targets on the basis of the phase information items of the reception signals.

As this method of estimating the angles of the targets, widely known angle estimating schemes such as ESPRIT (Estimation of Signal Parameters via Rotational Invariance Techniques), MUSIC (MUltiple Signal Classification), and PRISM (Panchromatic Remotesensing Instrument for Stereo Mapping) can be used.

<5. Angle Spectrum>

Figure 7:
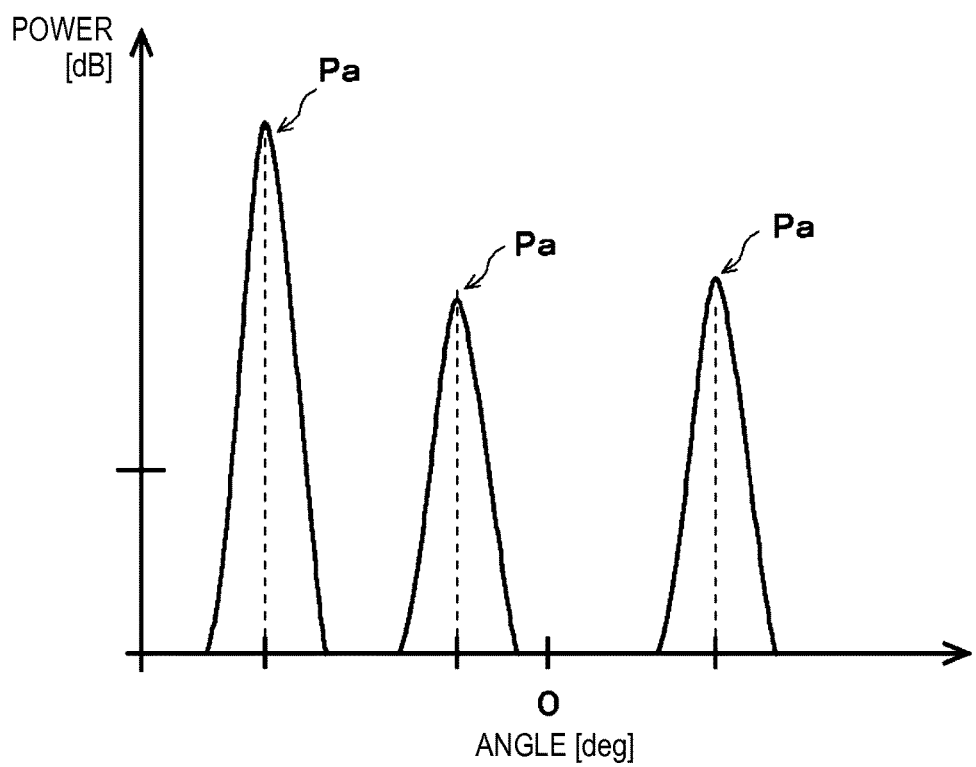
FIG. 7 is a view illustrating an example of an angle spectrum.

FIG. 7 is a view conceptually illustrating angles which the target detecting unit 71 estimated by an azimuth calculating process, as an angle spectrum. In FIG. 7, the vertical axis represents signal power in dB, and the horizontal axis represents angle in degrees. In the angle spectrum, the angles estimated by the azimuth calculating process are shown as peaks Pa. Hereinafter, the angles estimated by the azimuth calculating process will be referred to as the peak angles. Like this, a plurality of peak angles calculated at the same time from one peak frequency signal exhibits the angles and angle powers of a plurality of targets existing at the same bin.

The target detecting unit 71 performs peak angle detection as described above, on every peak frequency of the frequency spectra of both of the up section and the down section.

Like this, the target detecting unit 71 detects the peak frequencies of targets in both sections of the up section and the down section, and detects the peak angles of the targets on the basis of the detected peak frequencies. Hereinafter, a data item including a peak frequency and a peak angle will be referred to as a peak data item. Also, a peak data item includes a peak information item which is a plurality of parameters such as a frequency, an angel, and an angle power.

The target detecting unit 71 associates the peak data items of the up section and the peak data items of the down section by a pairing process. The target detecting unit 71 calculates Mahalanobis distances MD by the following Expression 6, for example, using the peak angles and angle powers of the individual sections.

$$MD = a(\theta d)^2 + b(\theta p)^2 \quad \text{[Expression 6]}$$

In Expression 6, $\theta d$ represents the angle difference between a peak angle of the up section and a peak angle of the down section, and $\theta p$ represents the power difference between the angle power of the up section and the angle power of the down section. Also, "a" and "b" represent coefficients.

The target detecting unit 71 detects each combination of peak data items between which the Mahalanobis distance MD becomes the minimum value, as a target data item, from the peak data items associated with each other. A target data item is obtained by associating two peak data items with each other, and thus is also referred to as a paired data item. Like this, a target data item includes a paired data item and a filter data item to be described below.

Using the peak information items of two peak data items of the up section and the down section which were the origins of the paired data item, the target processing unit 72 calculates the target information item of the target data item.

The target processing unit 72 uses the peak frequencies of the up section as the above described frequencies fup, and uses the peak frequencies of the down section as the above described frequencies fdn. Further, the target processing unit 72 calculates the longitudinal distance R of each target by using Expressions 2 and 3 described above, and calculates the relative speed V of each target by using Expressions 4 and 5 described above.

Furthermore, the target processing unit 72 calculates the angle $\theta$ of each target by the following Expression 7 when a peak angle of the up section is denoted by $\theta$up and a peak angle of the down section is denoted by $\theta$dn. Also, the target processing unit 72 can calculate the transverse distance of each target on the basis of the angle $\theta$ and longitudinal distance R of the corresponding target by an operation using the trigonometric functions.

$$\theta = \frac{\theta up + \theta dn}{2} \quad \text{[Expression 7]}$$

6. Data Acquiring Process

Figure 8:
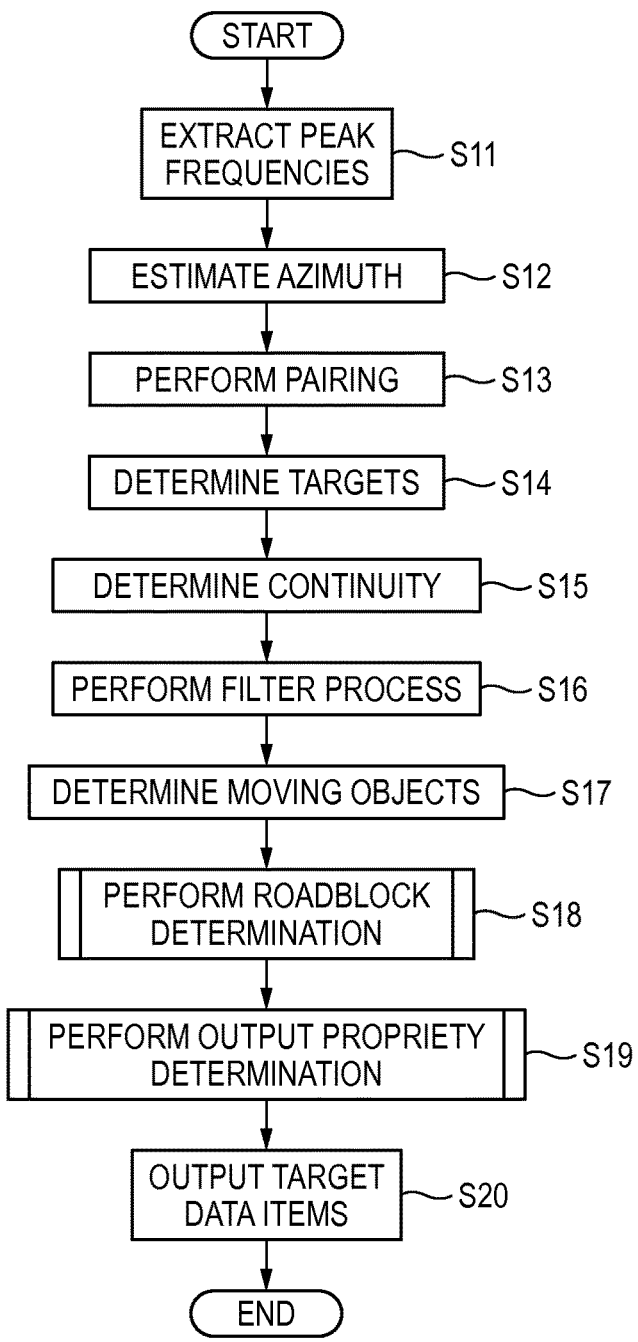
FIG. 8 is a process flow chart of a data acquiring process.

Now, the overall flow of a data acquiring process by which the data processing unit 7 calculates target data items and outputs the target data items to the vehicle control device 2 will be described. FIG. 8 is a process flow chart of the data acquiring process. The data processing unit 7 regularly repeats the data acquiring process at intervals of a predetermined time (for example, $\frac{1}{20}$ sec). At the start time of the data acquiring process, with respect to all of the four receiving antennae 51, the frequency spectra of both of an up section and a down section are input from the Fourier transform unit 62 to the data processing unit 7.

First, in STEP S11, the target detecting unit 71 of the data processing unit 7 extracts peak frequencies from the frequency spectra. The target detecting unit 71 extracts frequencies at which peaks having powers exceeding a predetermined threshold value are shown, as peak frequencies, from the frequency spectrum of each section of the up section and the down section.

Thereafter, in STEP S12, the target detecting unit 71 estimates the angle and angle power of each peak data item existing at the same bin, from peak angles related to the extracted peak frequencies. In this way, the target detecting unit 71 detects peak data items in both sections of the up section and the down section.

Subsequently, in STEP S13, the target detecting unit 71 associates the peak data items of the up section and the peak data items of the down section, and calculates Mahalanobis distances MD, and performs a pairing process of combining two peak data items between which the Mahalanobis distance MD becomes the minimum value. As a result, the target detecting unit 71 detects each paired data item based on two peak data items.

The target detecting unit 71 determines only paired data items relative to objects existing in reality, as paired data items to be used in the subsequent processes, from among the detected paired data items. In the detected paired data items, unnecessary data items such as noise may be included. For this reason, the target detecting unit 71 determines only data items relative to objects existing in reality, as paired data items, on the basis of a predetermined condition.

Subsequently, in STEP S15, the target processing unit 72 of the data processing unit 7 performs a continuity determining process of determining existence or non-existence of an association between each paired data item determined in the current data acquiring process (hereinafter, referred to as the "current process") and a paired data item determined in the past data acquiring process (hereinafter, referred to as the "past process").

The target processing unit 72 associates the paired data items of the current process and paired data items determined in the past process and having peak data items similar to those of the paired data items of the current process. Further, the target processing unit 72 determines each paired data item determined in the current process and capable of being associated with a paired data item of the past process, as a paired data item having temporal continuity with the paired data item of the past process. In short, the target processing unit 72 determines a paired data item of the current process and a paired data item of the past process having temporal continuity, as paired data items belonging to a common reflection point.

As described above, the target processing unit 72 performs a process of determining whether a paired data item having temporal continuity with respect to a paired data item of the past process has been detected as a paired data item of the current process.

Also, in a case where the target processing unit 72 determines with respect to the plurality of paired data items of the current process that there is no paired data item having temporal continuity with a paired data item of the past process, the target processing unit 72 performs "extrapolation" which is a process of deriving prediction data items of paired data items of the current process on the basis of the paired data items of the past process. Target data items having become objects of extrapolation processes in a plurality of data acquiring processes are deleted from the memory 63. It is considered that objects relative to those target data items do not exist in the transmission ranges, and the corresponding data items are deleted.

In a case where the target processing unit 72 determines, as the results of continuity determining processes of a plurality of data acquiring processes, that a paired data item of a past process has been consecutively associated with a paired data item of the current process in a predetermined number of times (for example, three times) or and more, in STEP S16, the target processing unit 72 performs a filter process. The filter process is a process of smoothing two paired data items, that is, a paired data item detected in the previous data acquiring process (hereinafter, referred to as the "previous process") and a paired data item detected in the current process, in a time axis direction.

The target data item subjected to the filter process is referred to as the "filter data item" relative to a paired data item representing an instantaneous value. The paired data item is a target data item derived in the current process, and the filter data item is a target data item obtained by adding a target data item derived in the current process and a target data item detected in the past process, at a predetermined ratio.

Subsequently, in STEP S17, the target processing unit 72 performs a moving-object determining process, and sets a moving-object flag, shortest-distance target flag, and front-vehicle flag of each filter data item.

The moving-object flag represents whether an object related to the filter data item is moving or not. The shortest-distance target flag represents whether the filter data item has the minimum transverse distance from among a plurality of filter data items. That is, the shortest-distance target flag is a flag which becomes an ON state with respect to a target exiting at a position closest to the vehicle CR. The front-vehicle flag represents whether the object related to the filter data item has moved in the same direction as that of the vehicle in the past.

The moving-object flag and the shortest-distance target flag are set in every data acquiring process so as to represent the movement state and position of the object at that moment in real time. In contrast, the front-vehicle flag has a value which is sequentially passed down by temporally continuous filter data items.

On the basis of the relative speed of each filter data item, and the speed of the vehicle which is acquired from a vehicle speed sensor 3 of the vehicle, the target processing unit 72 derives the ground speed (absolute speed) and running direction of an object related to the corresponding filter data item. Also, the speed of the vehicle CR is output from the vehicle speed sensor 3 to the vehicle control device 2. As a result, the radar device 1 acquires the speed of the vehicle CR from the vehicle control device 2. Thereafter, on the basis of the derived ground speed and the running direction, the target processing unit 72 sets the moving-object flag and front-vehicle flag of the corresponding filter data item.

Subsequently, in STEP S18, the target processing unit 72 performs a process of determining whether a filter data item on each still target satisfying a predetermined condition from among the plurality of filter data items is a filter data item on a roadblock. Thereafter, in STEP S19, the target processing unit 72 determines whether each filter data item satisfies an output condition for outputting the corresponding filter data item to the vehicle control device 2, with respect to the plurality of filter data items including filter data items subjected to the roadblock determining process.

Hereinafter, with respect to the data acquiring process, the roadblock determining process (STEP S18) of determining whether each filter data item is a filter data item on a roadblock, and the output propriety determining process (STEP S19) of determining whether each filter data item satisfies the output condition for outputting the corresponding filter data item to the vehicle control device 2 or not will be described in detail.

<6-1. Roadblock Determining Process>

Figure 9:
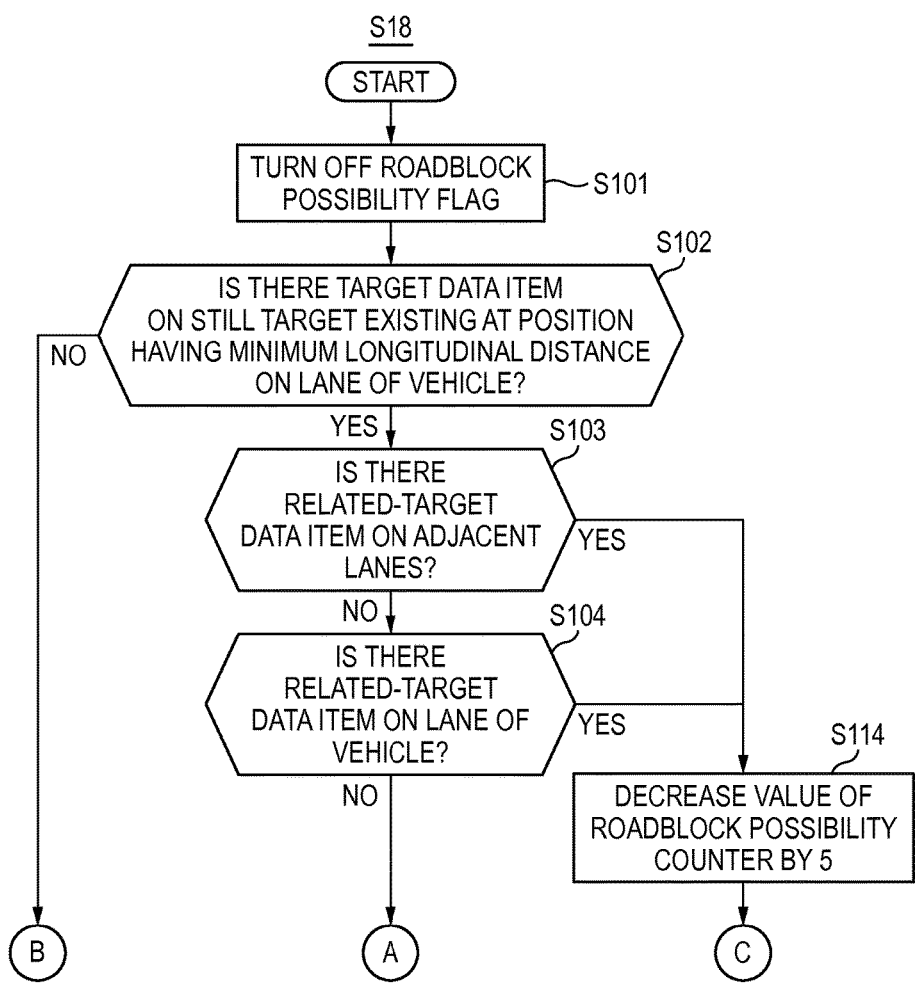
FIG. 9 is a flow chart of a roadblock determining process.
Figure 10:
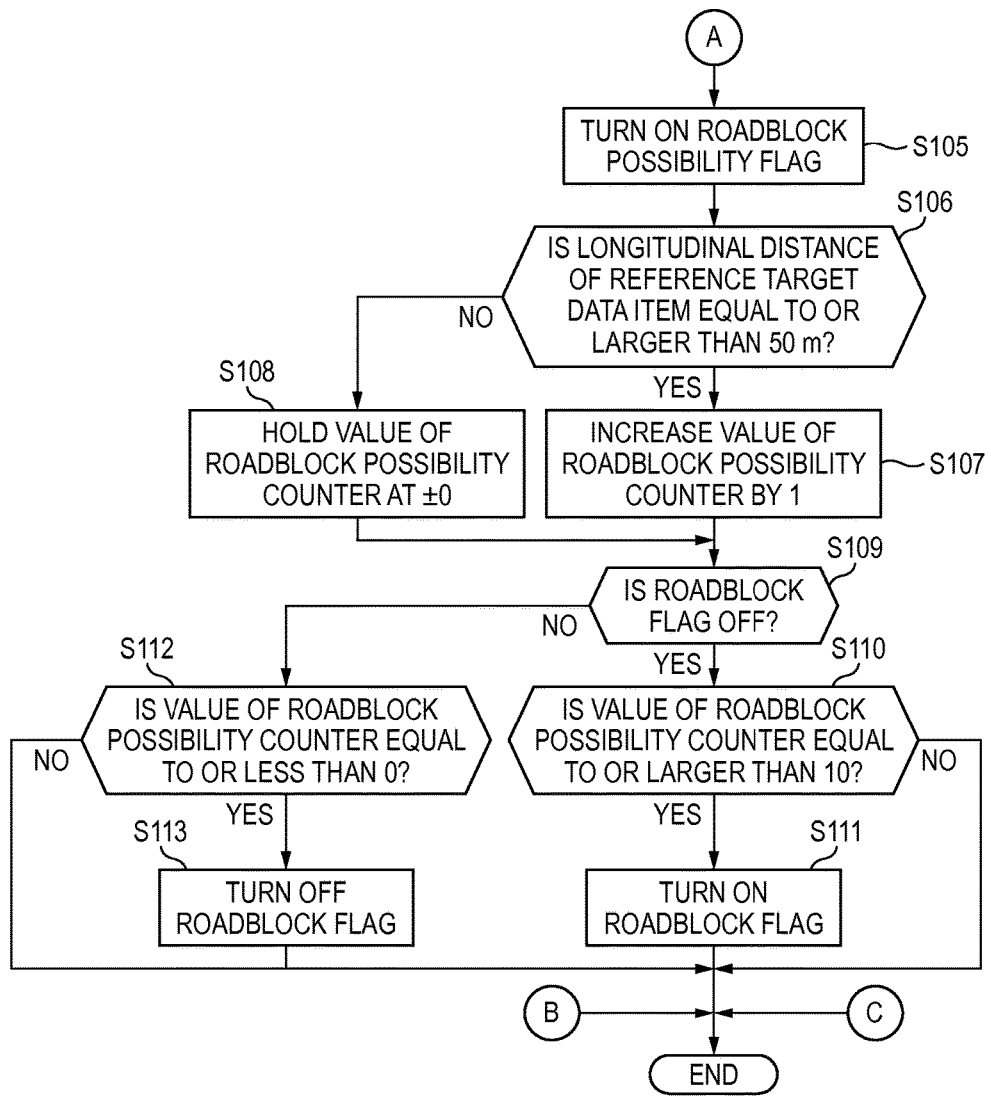
FIG. 10 is another flow chart of the roadblock determining process.

The roadblock determining process is a process of determining whether a filter data item (hereinafter, referred to as "still target data item") on a still target existing inside the lane of the vehicle and existing at a position having the shortest longitudinal distance from the position of the vehicle CR is a filter data item related to a roadblock such as a stopped vehicle. This roadblock determining process will be described with reference to FIGS. 9 to 13. FIGS. 9 and 10 are flow charts of the roadblock determining process.

In STEP S101, the target processing unit 72 turns off a roadblock possibility flag of the filter data item which is the process object. The roadblock possibility flag is a flag representing whether there is a possibility that the still target data item is a roadblock. As will be described below, in a case where the roadblock possibility flag is on, if the predetermined condition is satisfied in a plurality of data acquiring processes, the still target data item is determined as a data item having a relatively high possibility that the still target is a roadblock, and the roadblock flag (to be described below) is turned on.

Subsequently, in STEP S102, the determining unit 701 of the target processing unit 72 determines whether the plurality of filter data items include a target data item on any still target existing at a position having the minimum longitudinal distance on the lane of the vehicle. By this process, the determining unit 701 determines whether there is a filter data item on a reference target (hereinafter, referred to as a "reference target data item").

The specific process contents of this process will be described below. The determining unit 701 determines whether each filter data item satisfies the following conditions (a1)) to (a5).

(a1) A condition in which the moving-object flag should be off.

(a2) A condition in which the shortest-distance target flag should be on.

(a3) A condition in which the longitudinal distance should be equal to or less than 120 m.

(a4) A condition in which the transverse distance should be equal to or larger than −1.8 m.

(a5) A condition in which the transverse distance should be equal to or less than 1.8 m.

According to the conditions (a1)) and (a2), it is determined that the corresponding filter data item is a target data item on a still target existing at a position closest to the vehicle CR. According to the condition (a3), it is determined that the corresponding filter data item is a data item on a target exiting in front of the vehicle CR. According to the conditions (a4) and (a5), it is determined that the corresponding filter data item is a data item on a target existing in the lane of the vehicle in a case where the vehicle runs substantially along the center of the lane of the vehicle.

In a case where a filter data item satisfies all of the conditions (a1)) to (a5) ("Yes" in STEP S102), the determining unit 701 selects the corresponding filter data item as a reference target data item.

Figure 11:
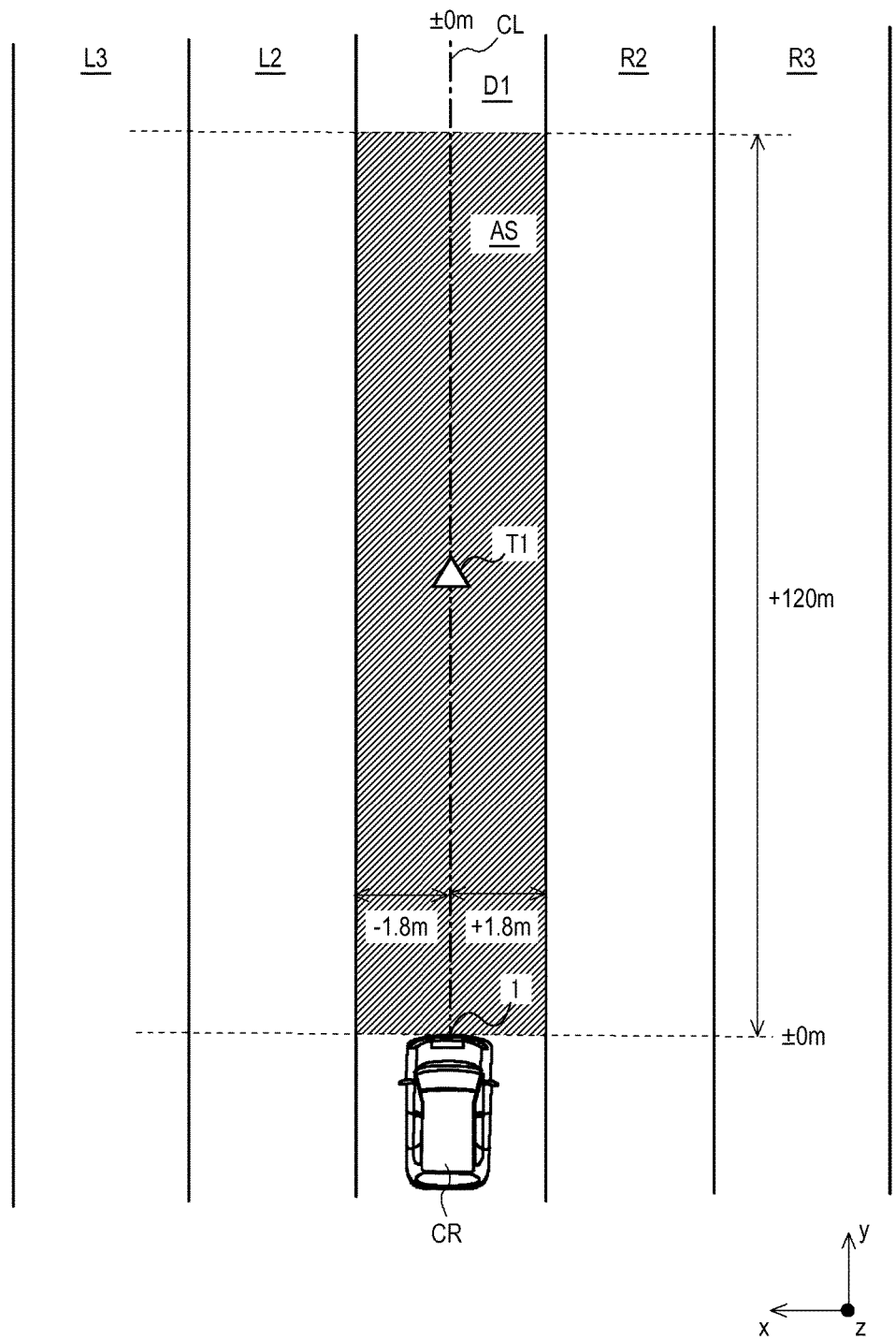
FIG. 11 is a view illustrating an example in which a determining unit selects a reference target data item.

Now, a specific example in which a filter data item is selected as a reference target data item will be described with reference to FIG. 11. FIG. 11 is a view illustrating an example in which the determining unit 701 selects a reference target data item. In FIG. 11, adjacent lanes (a left adjacent lane L2 and a right adjacent lane R2) are provided on the left and right of a lane D1 where the vehicle CR runs, and a leftmost lane L3 is provided on the left of the left adjacent lane L2, and a rightmost lane R3 is provided on the right of the right adjacent lane R2. Further, inside an area AS of the lane of the vehicle being equal to or less than 120 m in the longitudinal distance and being between ±1.8 m in the transverse distance, a filter data item T1 exists (the conditions (a3), (a4), and (a5) are satisfied). In a case where the moving-object flag of the filter data item T1 is off (the condition (a1) is satisfied), and the shortest-distance target flag thereof is on (the condition (a2) is satisfied), the determining unit 701 selects the filter data item T1 as a reference target data item T1.

Returning to the process of STEP S102 of FIG. 9, in a case where there is no filter data item satisfying all of the conditions (a1) to (a5) ("No" in STEP S102), the determining unit 701 finishes the roadblock determining process without selecting a reference target data item.

Subsequently, the determining unit 701 determines whether any other still target data item exists at a position in the vicinity of the reference target data item. By this process, it is determined whether there is any still target data item (hereinafter, referred to as a "related-target data item") belonging to the same object as an object to which the reference target data item belongs.

The specific process contents of this process will be described below. The determining unit 701 determines whether each filter data item satisfies either the following conditions (b1) to (b6) or the conditions (b1) to (b4), (b7), and (b8), or not.

(b1) A condition in which the moving-object flag should be off.

(b2) A condition in which the longitudinal distance should be equal to or less than 120 m.

(b3) The difference of the longitudinal distance of the filter data item from the longitudinal distance of the reference target data item should be equal to or larger than −50 m.

(b4) The difference of the longitudinal distance of the filter data item from the longitudinal distance of the reference target data item should be equal to or less than 50 m.

(b5) A condition in which the transverse distance should be less than −1.8 m.

(b6) A condition in which the transverse distance should be equal to or larger than −5.4 m.

(b7) A condition in which the transverse distance should be larger than 1.8 m.

(b8) A condition in which the transverse distance should be equal to or less than 5.4 m.

According to the conditions (b1) and (b2), it is determined that the corresponding filter data item is a still target data item existing in front of the vehicle CR. According to the conditions (b3) to (b8), it is determined that the corresponding filter data item exists in a range belonging to the same object with respect to the position of the reference target data item T1. Specifically, according to the conditions (b5) and (b6), it is determined that the corresponding filter data item exists in the range of the left adjacent lane L2. Also, according to the conditions (b7) and (b8), it is determined that the corresponding filter data item exists in the range of the right adjacent lane R2.

In a case where all of the conditions (b1) to (b6) are grouped into a condition "A", and all of the conditions (b1) to (b4), (b7), and (b8) are grouped into a condition "B", if the corresponding filter data item does not satisfy any condition of the condition "A" and the condition "B" ("No" in STEP S103), in the process of STEP S104, the determining unit 701 determines whether the corresponding filter data item is a related-target data item, on the basis of other determination conditions.

That is, in a case where the determining unit 701 determines, as the result of the determining process of STEP S103 based on the predetermined conditions, that any filter data item which may be a related-target data item does not exist at a position in the vicinity of the reference target data item T1, in the process of STEP S104, on the basis of other conditions, the determining unit 701 determines whether any filter data item which may be a related-target data item exists at a position in the vicinity of the reference target data item T1.

Also, a case where it is determined in the process of STEP S103 that any one condition of the condition "A" and the condition "B" is satisfied ("Yes" in STEP S103) will be described below.

Figure 12:
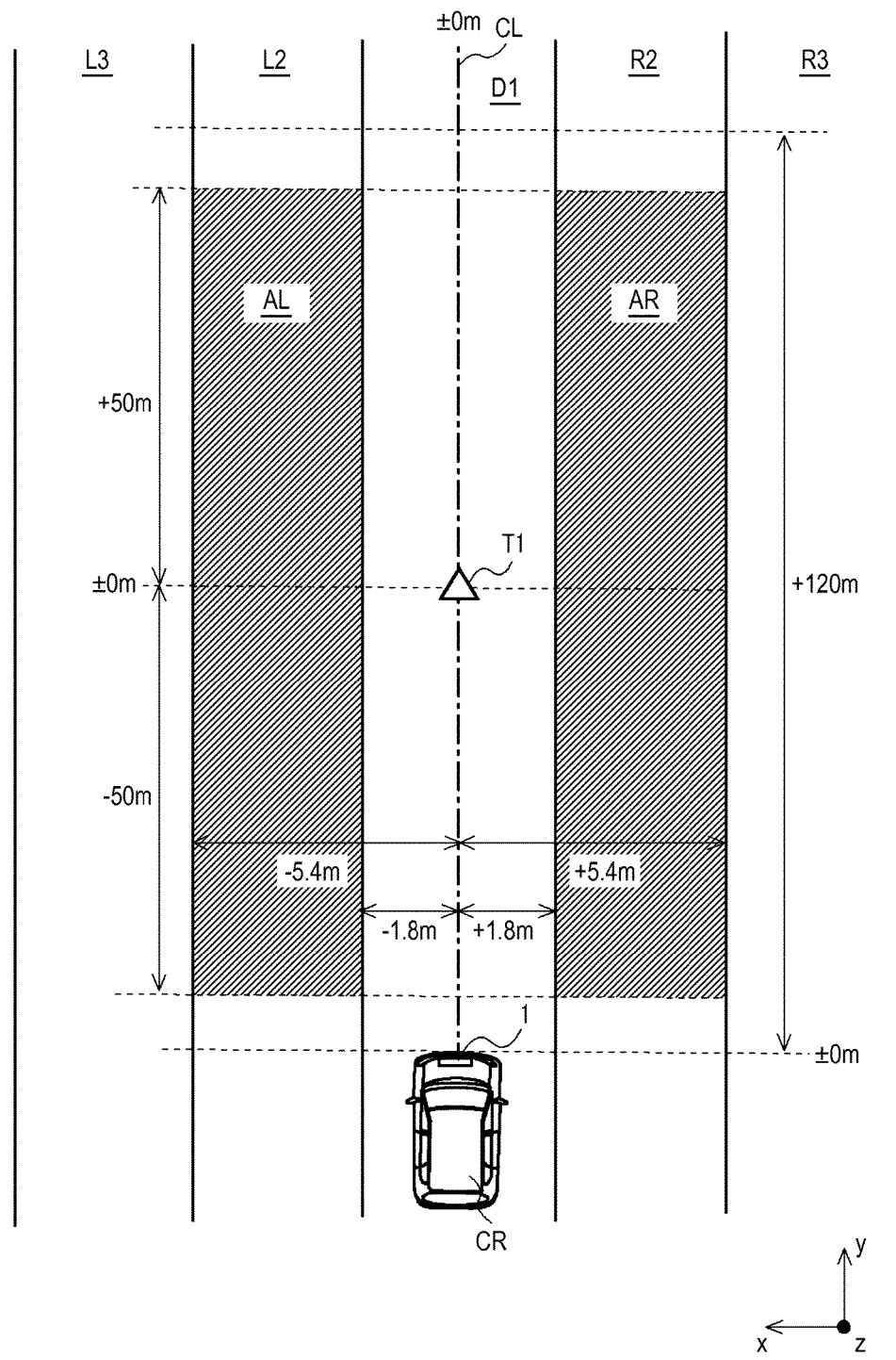
FIG. 12 is a view illustrating an example of a position in the vicinity of the reference target data item.

Now, a range in which a filter data item is determined as a related-target data item in the process of STEP S103, that is, a position in the vicinity of the reference target data item will be described in detail with reference to FIG. 12. FIG. 12 is a view illustrating an example of a position in the vicinity of the reference target data item. In FIG. 12, in a case where a filter data item which is an object of the determination has a longitudinal distance equal to or less than 120 m with respect to the vehicle CR (the condition (b2) is satisfied), and is in a left adjacent range AL being between a longitudinal distance of −50 m and a longitudinal distance of +50 m and being equal to or larger than a transverse distance of −5.4 m and less than a transverse distance of −1.8 m, with reference to the reference target data item T1 (the conditions (b3), (b4), (b5), and (b6) are satisfied), and a corresponding moving-object flag is off (the condition (b1) is satisfied), the determining unit 701 determines that the corresponding filter data item is a related-target data item.

For example, in a case where a filter data item related to an upper object such as a road sign or a traffic light is a reference target data item, a filter data item related to a member supporting the upper object, such as an iron pole, may exist in an adjacent lane range. For this reason, in a case where a filter data item exists in any one range of the left adjacent range AL and a right adjacent range AR, the determining unit 701 determines that the corresponding filter data item is a related-target data item.

Also, in a case where the right adjacent range AR is between a longitudinal distance of −50 m and a longitudinal distance of +50 m and is larger than a transverse distance of +1.8 m and equal to or less than a transverse distance of +5.4 m, with reference to the reference target data item T1, if a filter data item has a longitudinal distance equal to or less than 120 m with respect to the vehicle CR (the condition (b2) is satisfied), and is in the right adjacent range AR (the conditions (b3), (b4), (b7), and (b8) are satisfied), and a corresponding moving-object flag is off (the condition (b1) is satisfied), the determining unit 701 determines that the corresponding filter data item is a related-target data item.

In contrast to this, in a case where any filter data item does not exist in both ranges of the left adjacent range AL and the right adjacent range AR, the determining unit 701 determines that any filter data item which may be a related-target data item does not exist.

Returning to the process of STEP S104 of FIG. 9, on the basis of determination conditions different from the determination conditions described with respect to the above described STEP S103, the determining unit 701 determines whether any filter data item which may be a related-target data item exists.

The specific process contents of this process will be described below. The determining unit 701 determines whether each filter data item satisfies the following conditions (c1) to (c7).

(c1) A condition in which the moving-object flag should be off.

(c2) A condition in which the longitudinal distance should be equal to or less than 120 m.

(c3) The difference of the longitudinal distance of the filter data item from the longitudinal distance of the reference target data item should be equal to or larger than −50 m.

(c4) The difference of the longitudinal distance of the filter data item from the longitudinal distance of the reference target data item should be equal to or less than 50 m.

(c5) A condition in which the transverse distance should be equal to or larger than −1.8 m.

(c6) A condition in which the transverse distance should be equal to or less than 1.8 m.

(c7) The difference of the longitudinal distance of the filter data item from the longitudinal distance of the reference target data item should be equal to or less than −3.0 m.

The conditions (c1) to (c4) are the same conditions as the above described conditions (b1) to (b4). Further, according to the conditions (c5) and (c6), in a case where the vehicle CR runs substantially along the center of the vehicle lane D1, it is determined that the corresponding filter data item exists in the vehicle lane D1. According to the condition (c7), it is determined whether the corresponding filter data item is a data item which may belong to the same object as that of a reference target data item related to a roadblock, or a data item which may belong to the same object as that of a reference target data item related to an upper object.

In a case where the corresponding filter data item does not satisfy all of the conditions (c1) to (c7) ("No" in STEP S104), the determining unit 701 determines that any filter data item which may be a related-target data item relative to the reference target data item does not exist, and the reference target data item may be a filter data item related to a roadblock, and turns on the roadblock possibility flag of the corresponding reference target data item in STEP S105 shown in FIG. 10. Subsequently, in STEP S106, the determining unit 701 determines whether the longitudinal distance of the reference target data item whose roadblock possibility flag is on is equal to or larger than 50 m.

A process in a case where it is determined in the process of STEP S104 that the corresponding filter data item satisfies all of the conditions (c1) to (c7) ("No" in STEP S104) will be described below.

Figure 13:
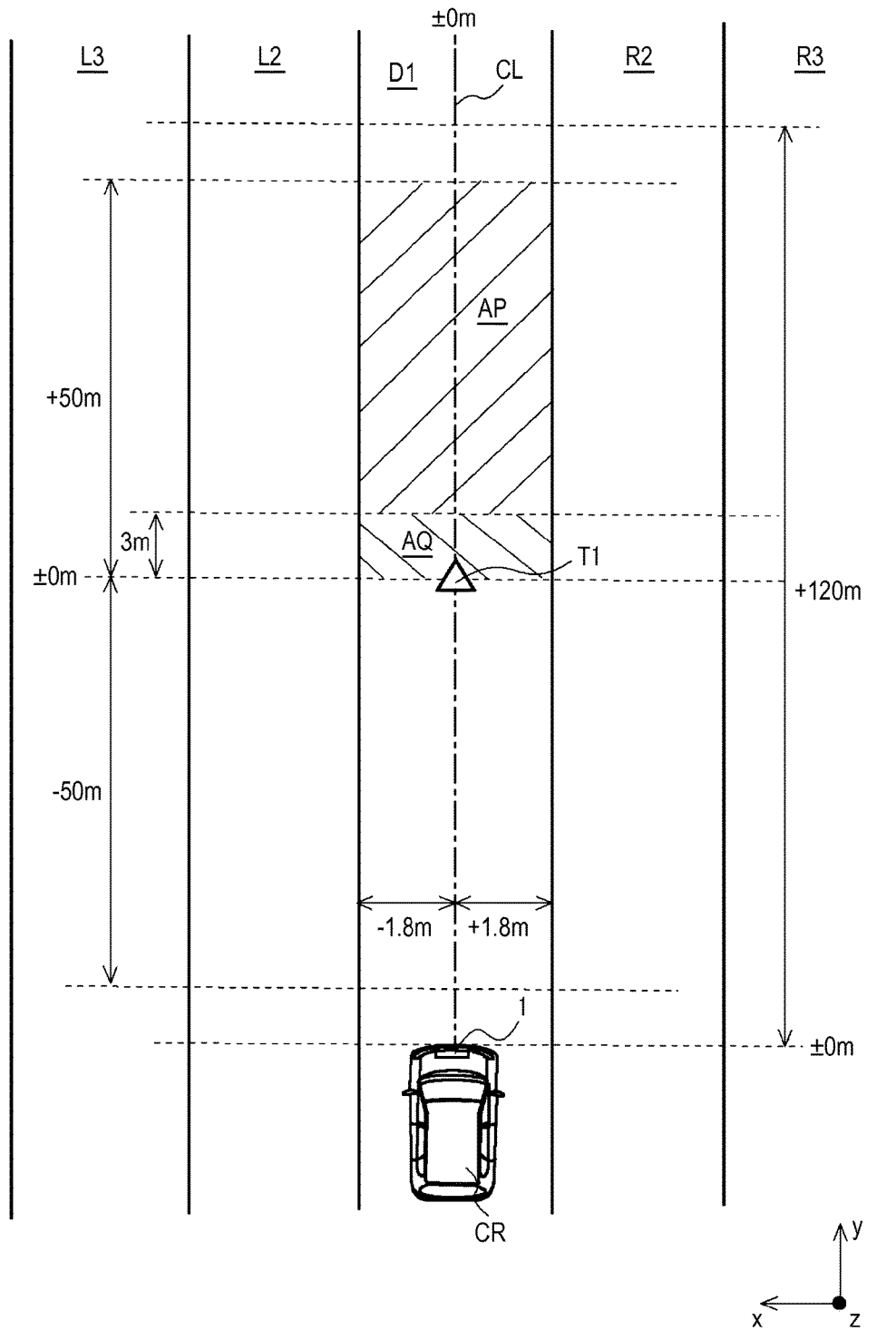
FIG. 13 is a view illustrating another example of the position in the vicinity of the reference target data item.

Now, a range in which a filter data item is determined as a related-target data item, that is, a position in the vicinity of the reference target data item will be described in detail with reference to FIG. 13. FIG. 13 is a view illustrating another example of a position in the vicinity of the reference target data item. In FIG. 13, in a case where a range AP of the lane of the vehicle is between the longitudinal distance of −50 m and a longitudinal distance of +50 m and is between a transverse distance of −1.8 m and a transverse distance of 1.8 m, with respect to the reference target data item T1, if a filter data item which is an object of the determination has a longitudinal distance equal to or less than 120 m with respect to the vehicle CR (the condition (c2) is satisfied), and is in the range AP (the conditions (c3) to (c7) are satisfied), and a corresponding moving-object flag is off (the condition (c1) is satisfied), the determining unit 701 determines that the corresponding filter data item is a related-target data item.

For example, in a case where a filter data item related to an upper object such as an emergency light provided at an upper portion of the inside of a tunnel is a reference target data item, such emergency lights may be provided at approximately equal intervals in the running direction of the vehicle. For this reason, in a case where a filter data item exists in the range AP of the lane of the vehicle from the position of the reference target data item T1 having the shortest longitudinal distance with respect to the vehicle CR, the determining unit 701 determines that the corresponding filter data item is a related-target data item.

In contrast to this, in a case where the filter data items exist in the range AQ of the same object which is equal to or less than a longitudinal distance of +3.0 m from the position of the reference target data item T1 and is between the transverse distance of −1.8 m and the transverse distance of +1.8 m, the determining unit 701 determines that any filter data item which may be a related-target data item does not exist. The filter data items existing in the range AQ of the same object can be considered, for example, as filter data items related to different reflection points of a stopped vehicle, and are likely to be data items belonging to the same roadblock as that of the reference target data item. For this reason, the determining unit 701 determines that filter data items existing in such a range do not satisfy the related-target data item conditions.

Also, in a case where any filter data item does not exist in the range AP of the lane of the vehicle, the determining unit 701 determines that any filter data item which may be a related-target data item does not exist.

Returning to the process of STEP S106 of FIG. 10, in a case where the longitudinal distance of the reference target data item is equal to or larger than 50 m ("Yes" in STEP S106), in STEP S107, the determining unit 701 increases the value of a roadblock possibility counter representing the level of the possibility that the reference target data item is a roadblock, by 1. Meanwhile, in a case where the longitudinal distance of the reference target data item is less than 50 m ("No" in STEP S106), in STEP S108, the determining unit 701 holds the value of the roadblock possibility counter (at ±0).

The reason why the value of the counter is increased in the case where the longitudinal distance of the reference target data item is equal to or larger than 50 m is that even if a roadblock is apart from the radar device by a certain distance, reflected waves from targets of the roadblock can be received by the radar device 1, and thus target data items can be derived. In other words, the reason is that, in a case where an upper object is apart from the radar device by a certain distance, reflected waves from targets of the upper object cannot be received by the radar device 1, and thus target data items cannot be derived. Meanwhile, in the case where the longitudinal distance of the reference target data item is less than 50 m, regardless of whether the reference target data item is related to a roadblock or an upper object, reflected waves can be received by the radar device 1. As a result, it becomes difficult to determine whether corresponding target data items are target data items on a roadblock or target data items on an upper object. For this reason, in the case where the longitudinal distance of the reference target data item is less than 50 m, the determining unit 701 holds the value of the roadblock possibility counter relative to the reference target data item.

After the value of the roadblock possibility counter is set, in STEP S109, the determining unit 701 determines whether the roadblock flag of the reference target data item is off. The roadblock flag is a flag which is turned on if the roadblock possibility counter of the reference target data item becomes equal to or larger than a predetermined value, and is a flag representing that the possibility that the corresponding reference target data item is a target data item related to a roadblock is relatively high.

In a case where the roadblock flag of the reference target data item is off ("Yes" in STEP S109), in STEP S110, the determining unit 701 determines whether the roadblock possibility counter of the corresponding reference target data item is equal to or larger than 10, or not. That is, the determining unit 701 determines whether the reference target data item satisfies a determination condition in which the possibility that the reference target data item is a roadblock should be relatively high.

In order to satisfy that determination condition, the reference target data item needs to satisfy a condition in which its longitudinal distance should be equal to or larger than 50 m and its roadblock possibility flag should be on, in at least 10 data acquiring processes.

In a case where the roadblock possibility counter of the reference target data item is equal to or larger than 10 ("Yes" in STEP S110), in STEP S111, the determining unit 701 switches the roadblock flag of the corresponding reference target data item from the OFF state to the ON state. Meanwhile, in a case where the roadblock possibility counter of the reference target data item is less than 10 ("No" in STEP S110), the determining unit 701 finishes the process.

Returning to the process of the STEP S109, in a case where the roadblock flag of the reference target data item is on ("No" in STEP S109), the determining unit 701 determines whether the roadblock possibility counter of the corresponding reference target data item is equal to or less than 0, or not. In a case where the roadblock possibility counter of the reference target data item is equal to or less than 0 ("Yes" in STEP S112), in STEP S113, the determining unit 701 switches the roadblock flag of the corresponding reference target data item from the ON state to the OFF state. Since the roadblock flag is turned off, the corresponding reference target data item becomes a target data item unlike to be a roadblock.

Also, in a case where the determining unit 701 determines in the process of STEP S103 of FIG. 9 that a filter data item exists in any one range of the left adjacent range AL and the right adjacent range AR and the corresponding filter data item is a related-target data item ("Yes" in STEP S103), the determining unit 701 decreases the value of the roadblock possibility counter of the reference target data item by 5 in STEP S114, and finishes the process. Also, in a case where the determining unit 701 determines in the process of STEP S104 that a filter data item exists in the range AP of the lane of the vehicle, and the corresponding filter data item is a related-target data item ("Yes" in STEP S104), the determining unit 701 decreases the value of the roadblock possibility counter of the reference target data item by 5 in STEP S114, and finishes the process.

<6-2. Output Propriety Determining Process>

Subsequently, the determining unit 701 determines whether each of the plurality of filter data items including filter data items on moving objects (hereinafter, referred to as moving target data items) and still target data items satisfies the output condition for outputting it to the vehicle control device 2. In this determination, the setting unit 702 of the target processing unit 72 makes it easy to determine the reference target data item whose roadblock flag on, as a roadblock. Specifically, the setting unit 702 designates the reference target data item whose roadblock flag is on, as a target data item related to a roadblock, and eases the output condition such that it becomes easy for the reference target data item to be output to the vehicle control device 2. Filter data output propriety determination including that process will be described with reference to FIG. 14.

Figure 14:
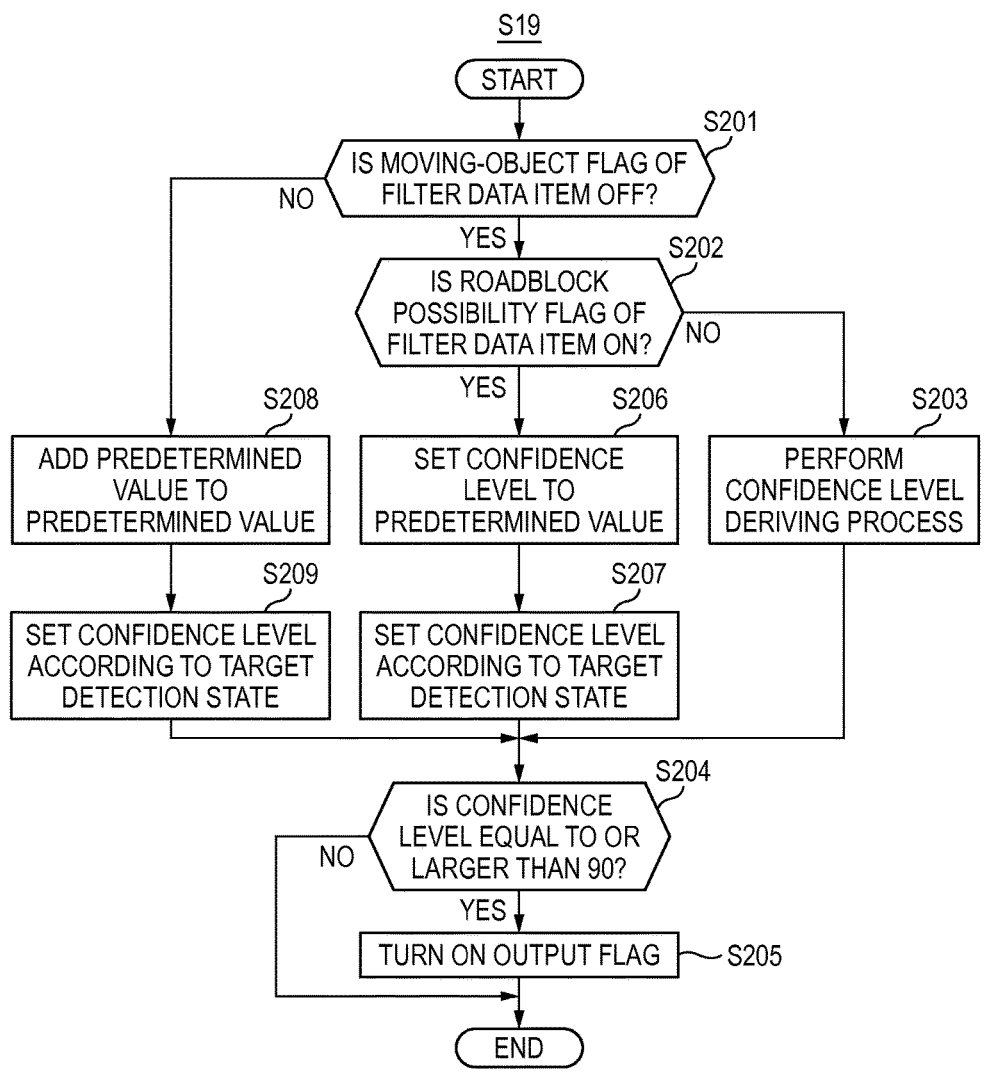
FIG. 14 is a flow chart of an output propriety determining process on filter data items.

FIG. 14 is a process flow chart of filter data output propriety determination. With reference to this process flow chart, output propriety determining processes on a still target data item and a moving target data item will be described. Also, with respect to a still target data item, processes of determining a filter data item whose roadblock flag is on and a filter data item whose roadblock flag is off will be described. Hereinafter, the determining processes will be described in the order of a still target data item whose roadblock flag is off, a still target data item whose roadblock flag is on, and a moving target data item.

<6-2-1. Still Target Data Item Whose Roadblock Flag is Off>

First, a determination condition of a still target data item whose roadblock flag is off will be described. With respect to a still target data item whose roadblock flag is off, on the basis of a plurality of parameters relative to the corresponding target data item, whether the still target data item is a filter data item related to a roadblock is determined, and the propriety of output of the still target data item to the vehicle control device 2 is determined. Hereinafter, specific processes will be described.

The determining unit 701 determines whether a filter data item which is an object of the determination is a still target data item. The determining unit 701 performs this determination on the basis of the moving-object flag of the filter data item.

In a case where the moving-object flag of the filter data item is off (STEP S201), that is, in a case where the filter data item is a still target data item, in STEP S202, the determining unit 701 determines whether the roadblock flag of the corresponding filter data item is on.

In a case where the roadblock flag of the filter data item is off ("No" in STEP S202), that is, in a case where the filter data item is not a reference target data item but a data item unlikely to be a roadblock, in STEP S203, the setting unit 702 calculates a confidence level which is an index indicating whether the corresponding filter data item is a data item to be an object of output to the vehicle control device 2. Here, in a case where the filter data item is a still target data item, the confidence level becomes an index indicating whether the corresponding still target data item is a data item related to a roadblock.

The confidence level is, for example, a value in the range from 0 to 100, and calculation of the confidence level relative to a still target data item whose roadblock flag is off is performed using a plurality of parameter information items including the target information item of the target data items which is a filter data item and the peak information item of a peak data item constituting the target data item.

Specifically, the setting unit 702 calculates the confidence level on the basis of a plurality of parameters such as the longitudinal distance, vertical height, angle power, average FFT-power value, and the like of the still target data item whose roadblock flag is off. Hereinafter, the confidence level calculation based on those parameters will be sequentially described.

The setting unit 702 sets a larger value as the confidence level as the longitudinal distance of the still target data item is larger, and sets a smaller value as the confidence level as the longitudinal distance is smaller. In a case of a roadblock, even if the roadblock is apart by a certain distance, target data items can be detected. For this reason, if the longitudinal distance of the still target data item is larger than a reference value, the possibility that a corresponding still target is a roadblock is high. Therefore, in a case where the longitudinal distance of the still target is small (for example, 40 m), the setting unit 702 sets, for example, 60 as the confidence level of the corresponding still target data item; whereas, in a case where the longitudinal distance is large (for example, 70 m), the setting unit 702 sets, for example, 70 as the confidence level of the corresponding still target data item.

Like this, as for the confidence level of the still target data item whose roadblock flag is off, a value which is about 60 percents or more of the value of the confidence level is set according to the longitudinal distance of the corresponding data item, and the set value is increased or decreased on the basis of the other parameters than the longitudinal distance.

Subsequently, the setting unit 702 increases the confidence level as the vertical height of the still target data item decreases, and decreases the confidence level as the vertical height increases. In a case where the vertical height of the still target data item is lower than a reference value, the possibility that the corresponding still target data item is a roadblock existing on the roadway surface RT is high. For this reason, if the height of the still target data item is low, the setting unit 702 increases the confidence level of the corresponding still target data item, for example, by up to 10; whereas, if the height of the still target data item is high, the setting unit 702 decreases the confidence level of the corresponding still target data item, for example, by up to 10.

Also, the vertical height of the still target data item is calculated on the basis of differences between the signal levels of reflected wavers of upper and lower beams of the transmission waves TW1 and TW2 which are output toward the upper left and right sides with respect to the roadway surface RT and the transmission waves TW3 and TW4 which are output toward the lower left and right sides with respect to the roadway surface RT. For example, as a value which is obtained by subtracting the signal level of the reflected wave of the transmission wave TW3 from the signal level of the reflected wave of the transmission wave TW1 increases, the value of the vertical height is calculated as a larger value.

Subsequently, the setting unit 702 increases the confidence level as the angle power of the still target data item increases, and decreases the confidence level as the angle power decreases. The signal levels of reflected waves from roadblocks are higher than those of reflected waves of upper objects. Therefore, in a case where the angle power of the still target data item is larger than a reference value, the possibility that the corresponding still target data item is a roadblock is high. For this reason, if the angle power of the still target data item is large, the setting unit 702 increases the confidence level of the corresponding still target data item, for example, by up to 20; whereas, if the angle power of the still target data item is small, the setting unit 702 decreases the confidence level of the corresponding still target data item, for example, by up to 20.

Subsequently, the setting unit 702 increases the confidence level as the extrapolation frequency of the still target data item decreases, and decreases the confidence level as the extrapolation frequency increases. Since roadblocks exist together with the vehicle CR on the roadway surface RT, the extrapolation frequencies of roadblocks in a plurality of data acquiring processes are lower than those of upper objects. Therefore, in a case where the extrapolation frequency of the still target data item is lower than a reference value, the possibility that the corresponding still target data item is a roadblock is high. For this reason, if the extrapolation frequency of the still target data item is low, the setting unit 702 increases the confidence level of the corresponding still target data item, for example, by up to 5; whereas, if the extrapolation frequency is high, the setting unit 702 decreases the confidence level of the corresponding still target data item, for example, by up to 5.

Subsequently, the setting unit 702 increases the confidence level as the average signal-level (FFT-power) value of the frequency spectrum in the data acquiring process in which the paired data item of the still target data item has been detected decreases from a reference value, and decreases the confidence level if the average FFT-power value increases from the reference value. The average FFT-power value is, for example, an average value of the signal level values of individual bins of the frequency spectrum in one data acquiring process. A case where the average FFT-power value is large represents that relatively many target data items exist around the still target data item. Therefore, the determining unit 701 may be unable to accurately perform determination on whether the still target data item is a roadblock, due to influence of other target data items.

In contrast to this, a case where the average FFT-power value is small represents that the number of targets existing around the still target data item is relatively small. Therefore, the determining unit 701 may be able to accurately perform determination on whether the still target data item is a roadblock. For this reason, in a case where the average FFT-power value related to the still target data item is small, the setting unit 702 sets a decrease value of the confidence level of the corresponding still target data item, for example, to ±0; whereas, in a case where the average FFT-power value is large, the setting unit 702 sets a decrease value of the confidence level of the corresponding still target data item, for example, to 25 which is the maximum.

In STEP S203, in that way, the setting unit 702 sets the confidence level based on the longitudinal distance, with respect to the still target data item whose roadblock flag is off, and increases or decreases the confidence level of the corresponding still target data item on the basis of the other parameters, thereby deriving the confidence level of the still target data item which is the process object.

In a case where the confidence level of the still target data item whose roadblock flag is off is 90 or more ("Yes" in STEP S204), the determining unit 701 determines that the corresponding still target data item is a roadblock, and is an object to be output to the vehicle control device 2, and turns on an output flag relative to output to the vehicle control device 2 in STEP S205. Meanwhile, in a case where the confidence level of the still target data item whose roadblock flag is off is less than 90 ("No" in STEP S204), the determining unit 701 determines that the corresponding still target data item is not a roadblock, and is not an object to be output to the vehicle control device 2, and finishes the process.

<6-2-2. Still Target Data Item Whose Roadblock Flag is On>

Now, a determination condition of a still target data item whose roadblock flag is on will be described. In the above described process of the still target data item whose roadblock flag is off, the setting unit 702 calculates the confidence level of the corresponding still target data item on the basis of the plurality of parameters related to the target data item, and the determining unit 701 determines whether the still target data item is a roadblock, that is, whether the still target data item is an object to be output to the vehicle control device 2, on the basis of the confidence level. In contrast to this, in a process (to be described below) on a still target data item whose roadblock flag is on, the setting unit 702 does not calculate a confidence level based on a plurality of parameters related to the target data item. Since the roadblock flag of the still target data item is on, it is determined that the possibility that the corresponding still target data item is a roadblock is high, and the setting unit 702 increases the confidence level of the still target data item whose roadblock flag is on by a predetermined value (for example, a confidence level of 80). Like this, the confidence level of the still target data item whose roadblock flag is on is set to a relatively high value, and does not decrease on the basis of the plurality of parameters. Therefore, the corresponding still target data item is more easily determined as a roadblock, as compared to a still target data item whose roadblock flag is off.

Further, on the state of detection on whether the still target data item whose roadblock flag is on has been actually detected, or has been extrapolated, the determining unit 701 determines the propriety of output of the corresponding still target data item to the vehicle control device 2. It has been already determined that the possibility that the still target data item whose roadblock flag is on is a roadblock is high, and a confidence level of a relatively high value has been set. Since this still target data item is likely to need to be output to the vehicle control device 2, the determining unit 701 determines the propriety of output to the vehicle control device 2 only on the basis of the detection state of the corresponding still target data item, without depending on the plurality of parameters. As described above, with respect to the still target data item whose roadblock flag is on, a condition for outputting the corresponding target data item to the vehicle control device 2 is eased as compared to a still target data item whose roadblock flag is off. Hereinafter, specific processes will be described.

In a case where it is determined in the process of STEP S202 of FIG. 14 that the roadblock flag of the still target data item is on ("Yes" in STEP S202), in STEP S206, the setting unit 702 sets the confidence level of the corresponding still target data item to 80. Subsequently, in STEP S207, the setting unit 702 sets the confidence level according to the detection state of the still target data item whose roadblock flag is on. Specifically, in a case where the still target data item has been associated with a target data item of a past process in the continuity determining process (STEP S15) of the data acquiring process, the setting unit 702 increases the confidence level of the corresponding still target data item by 4; whereas, in a case where the still target data item has been extrapolated without being associated with a target data item of a past process, the setting unit 702 decreases the confidence level of the corresponding still target data item by 2.

In STEP S204, the determining unit 701 determines whether the confidence level of the still target data item whose roadblock flag is on is equal to or larger than 90, or not. In a case where the confidence level is equal to or larger than 90 ("Yes" in STEP S204), that is, in a case where the still target data item whose roadblock flag is on has been consecutively detected in at least three data acquiring processes, in STEP S205, the determining unit 701 turns on the output flag of the still target data item whose roadblock flag is on. The output flag is a flag representing whether the corresponding filter data item is an object to be output to the vehicle control device 2.

Specifically, in a case where the still target data item whose roadblock flag is on has been consecutively detected in three data acquiring processes, the confidence level of the corresponding still document becomes 92 (80+12), and the output flag of the corresponding data item is turned on. Meanwhile, in a case where the confidence level of the still target data item whose roadblock flag is on is less than 90 ("No" in STEP S204), this process finishes.

Like this, in a case where any related-target data item belonging to the same object as that of a reference target data item existing the lane of the vehicle does not exist around the reference target data item, the radar device 1 sets a confidence level of a predetermined value representing that the possibility that the corresponding reference target data item is a roadblock is relatively high. As a result, the radar device 1 easily determines that the reference target data item is a data item related to a roadblock. Therefore, the radar device 1 can accurately determine whether a still target is a roadblock. Also, with respect to the reference target data item for which the confidence level of the predetermined value has been set, the radar device 1 increases the confidence level according to the detection state, thereby easing the output condition for outputting the reference target data item to the vehicle control device 2. As a result, the radar device 1 can surely output target data items necessary for vehicle control, to the vehicle control device 2. Also, the vehicle control device 2 can surely acquire target data items necessary for vehicle control, and can perform vehicle control for ensuring the safety of a user of the vehicle.

<6-2-3. Moving Target Data Item>

Subsequently, a determination condition of a moving target data item will be described. Similarly to the above described case of the still target data item whose roadblock flag is on, the setting unit 702 sets a confidence level of a predetermined value with respect to a moving target data item. Also, the setting unit 702 increases or decreases the confidence level of the moving target data item according to the detection state of the corresponding target data item. Then, in a case where the confidence level of the moving target data item is equal to or larger than 90, the determining unit 701 turns on the output flag of the corresponding moving target data item.

Specifically, in a case where it is determined in the process of STEP S201 of FIG. 14 that the moving-object flag of the filter data item is on ("No" in STEP S201), in STEP S208, the setting unit 702 sets the confidence level of the corresponding moving target data item to 80. Thereafter, in STEP S209, the setting unit 702 sets the confidence level according to the detection state of the moving target data item. Specifically, in a case where the moving target data item has been associated with a target data item of a past process in the continuity determining process (STEP S15) of the data acquiring process, the setting unit 702 increases the confidence level of the corresponding moving target data item by 4; whereas, in a case where the moving target data item has been extrapolated without being associated a target data item of a past process, the setting unit 702 decreases the confidence level of the corresponding moving target data item by 2.

Thereafter, in STEP S204, the determining unit 701 determines whether the confidence level of the moving target data item is equal to or larger than 90, or not. In a case where the confidence level is equal to or larger than 90 ("Yes" in STEP S204), that is, in a case where the moving target data item has been consecutively detected in three data acquiring processes, in STEP S205, the determining unit 701 turns on the output flag of the moving target data item. Meanwhile, in a case where the confidence level of the moving target data item is less than 90 ("No" in STEP S204), this process finishes.

As compared to still objects, the distances of moving objects from the vehicle CR vary more rapidly, and thus the moving objects have a higher risk of collision with the vehicle. For this reason, a condition for outputting moving target data items to the vehicle control device 2 is looser as compared to still target data items of which output propriety is determined on the basis of a plurality of parameters. Therefore, it can also be said that the output condition for outputting still target data items whose roadblock flags are on to the vehicle control device 2 is the same as that for moving target data items, and is looser than that for still target data items whose roadblock flags are off.

Returning to the process of STEP S20 shown in FIG. 8, the target outputting unit 73 outputs target data items which are filter data items, whose output flags are on, of the filter data items processed by the target processing unit 72, to the vehicle control device 2.

<Summary>

As described above, the determining unit 701 designates a still target existing in the range of the vehicle lane D1 and having the shortest longitudinal distance, as a reference target, and determines whether any other still target belonging to the same object as that of the reference target exists in the vicinity of the reference target. In a case where a reference target which is at a position apart from the vehicle by a certain distance (for example, a longitudinal distance of 50 m or more) is detected, if any other still target does not exist in the vicinity of the reference target in a plurality of data acquiring processes, the determining unit 701 determines that the possibility that the corresponding reference target is a roadblock is relatively high, and turns on the roadblock flag of the reference target.

Then, the setting unit 702 increases the confidence level of the reference target whose roadblock flag is on, thereby making it easy to determine the reference target as a roadblock. In a case where this reference target having the increased confidence level has been consecutively detected a plurality of times (for example, three times), the determining unit 701 turns on the output flag for outputting the target data item of the reference target to the vehicle control device 2. As a result, the radar device 1 can accurately discriminate still targets which are roadblocks, and can surely output their target data items to the vehicle control device 2. Also, the vehicle control device 2 can control the vehicle CR on the basis of the target data items related to roadblocks and acquired from the radar device 1, such that the safety of the user is ensured.

Second Embodiment

Now, a second embodiment will be described. The data processing unit 7 of the radar device 1 of the second embodiment performs a surrounding-environment determining process before performing the roadblock determining process of the data processing described with respect to the first embodiment. The surrounding-environment determining process is a process of determining whether any still target data item has been detected in a predetermined range including a plurality of lanes, that is, the vehicle lane D1, the left adjacent lane L2, the right adjacent lane R2, the leftmost lane L3, and the rightmost lane R3, in a past process.

In a case where the number of still target data items detected in the predetermined range in the surrounding-environment determining process of the past process exceeds a predetermined value, in the current process, the data processing unit 7 does not perform the roadblock determining process. In contrast to this, in a case where the number of still target data items detected in the predetermined range in the surrounding-environment determining process of the past process is equal to or less than the predetermined value, in the current process, the data processing unit 7 performs the roadblock determining process. Like this, as a pre-process of determining whether to perform the roadblock determining process, the surrounding-environment determining process is performed.

The configuration and processes of the radar device 1 of the second embodiment are substantially identical to those of the first embodiment except that since the data acquiring process additionally includes the surrounding-environment determining process as described above, and thus the process contents of the second embodiment is partially different from that of the first embodiment. Hereinafter, these differences will be mainly described with reference to FIGS. 15 to 19.

<7. Block Diagram of Radar Device>

Figure 15:
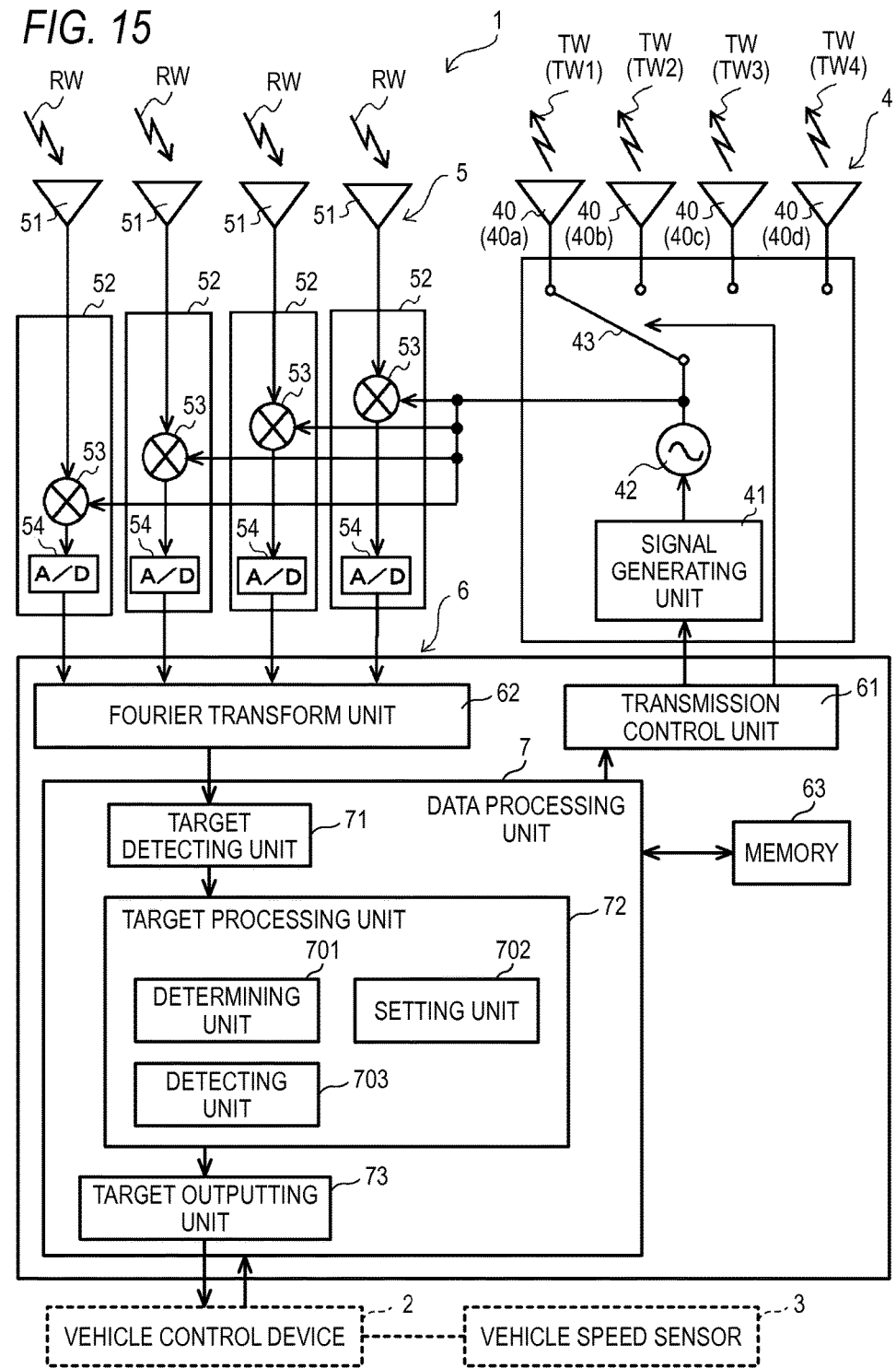
FIG. 15 is a view illustrating the configuration of a radar device of a second embodiment.

FIG. 15 is a view illustrating the configuration of the radar device 1 of the second embodiment. The data processing unit 7 of the radar device 1 includes a detecting unit 703.

The detecting unit 703 detects still target data items existing in the predetermined range including a plurality of lanes. Also, these still target data items are still target data items of a past process. For example, these still target data items are still target data items of the previous process.

In a case where the number of still target data items detected in the predetermined range in the previous process is equal to or less than a predetermined value, in the current process, the determining unit 701 performs the roadblock determining process.

<8. Data Acquiring Process>

Figure 16:
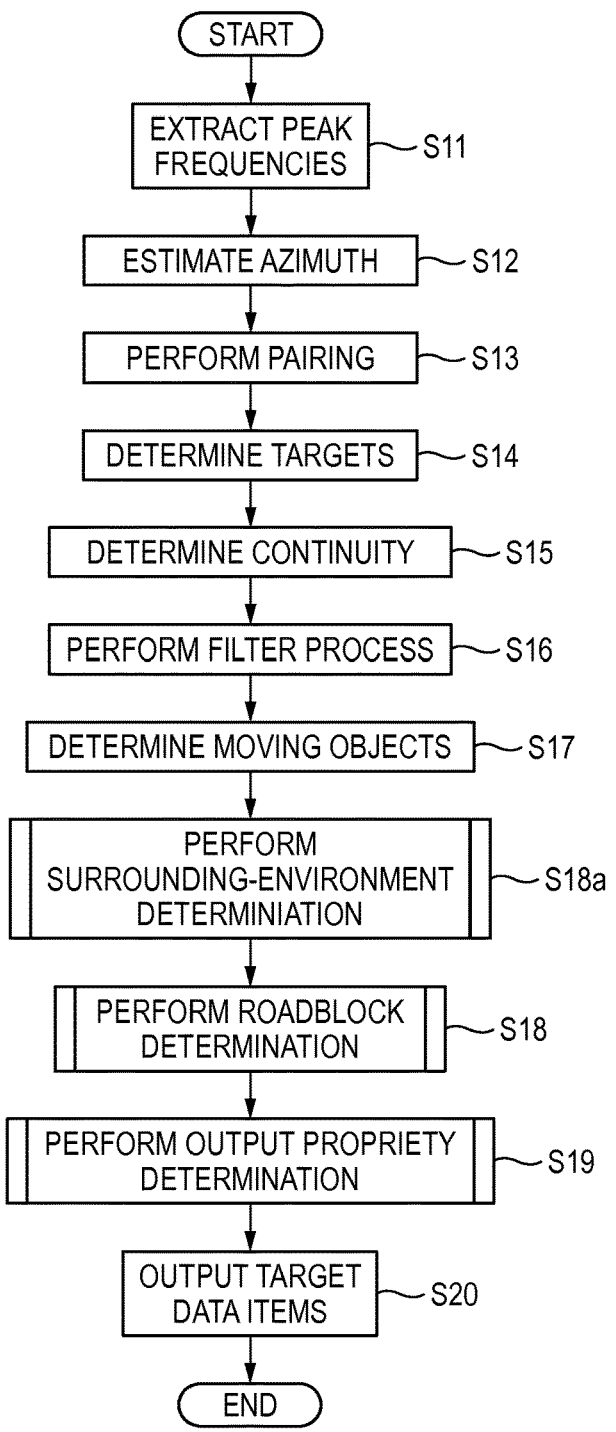
FIG. 16 is a process flow chart illustrating a data acquiring process of the second embodiment.

Now, the data acquiring process of the second embodiment will be described. FIG. 16 is a process flow chart illustrating the data acquiring process of the second embodiment. After the moving-object determining process of STEP S17 is performed, in STEP S18a, the detecting unit 703 performs the surrounding-environment determining process.

<8-1. Surrounding-Environment Determining Process>

Figure 17:
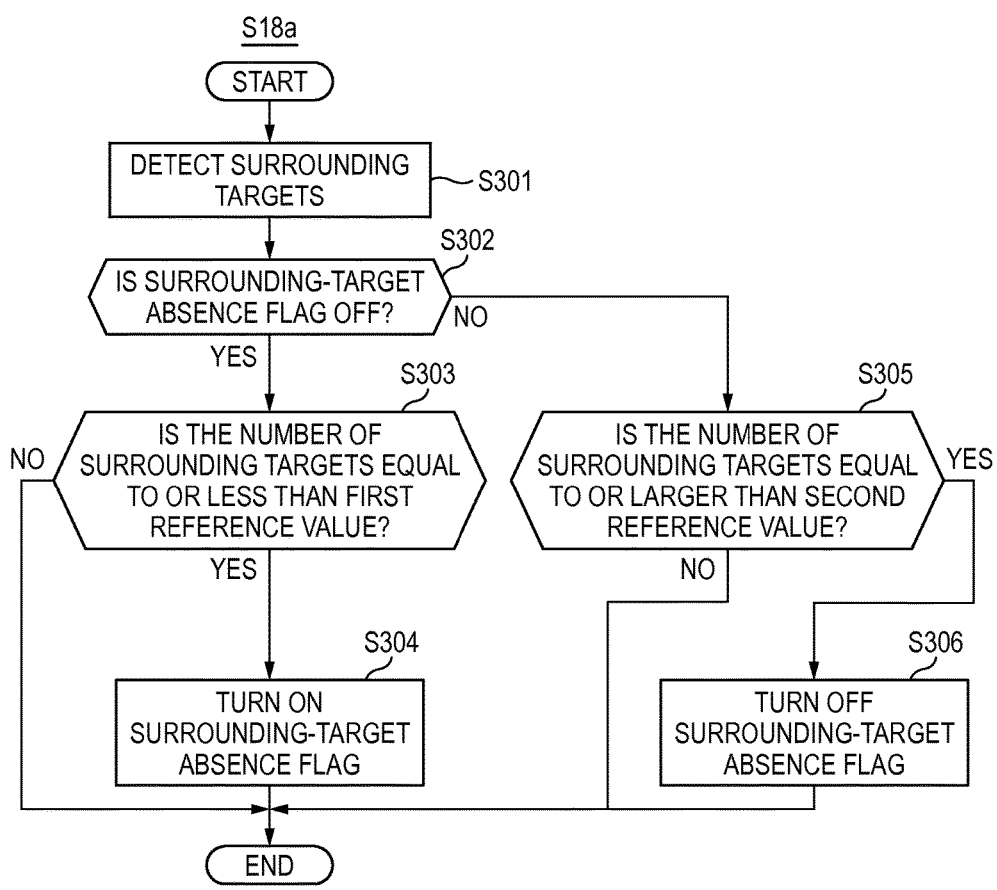
FIG. 17 is a process flow chart illustrating a surrounding-environment determining process.

The surrounding-environment determining process will be described with reference to FIG. 17. FIG. 17 is a process flow chart illustrating the surrounding-environment determining process. In STEP S301, the detecting unit 703 detects surrounding still target data items. Specifically, the detecting unit 703 detects still target data items existing in the predetermined range including a plurality of lanes, that is, the vehicle lane D1, the left adjacent lane L2, the right adjacent lane R2, the leftmost lane L3, and the rightmost lane R3.

The specific process contents of this process will be described below. The detecting unit 703 detects still target data items satisfying all of the following conditions (d1)) to (d3), from among the plurality of filter data items.

(d1)) A condition in which the longitudinal distance should be equal to or less than 120 m.

(d2) A condition in which the transverse distance should be equal to or larger than −1.8 m.

(d3) A condition in which the transverse distance should be equal to or less than 1.8 m.

According to the conditions (d1), (d2), and (d3) (which are grouped into a condition "D"), still target data items existing in front of the vehicle CR and existing in the vehicle lane D1 in a case where the vehicle CR runs substantially along the center of the vehicle lane D1 are detected.

Also, the detecting unit 703 detects still target data items satisfying all of the following conditions (e1)) to (e3), from among the plurality of filter data items.

(e1)) A condition in which the longitudinal distance should be equal to or less than 120 m.

(e2) A condition in which the transverse distance should be equal to or larger than −5.4 m.

(e3) A condition in which the transverse distance should be less than −1.8 m.

According to the conditions (e1), (e2), and (e3) (which are grouped into a condition "E"), still target data items existing in front of the vehicle CR and existing in the left adjacent lane L2 in a case where the vehicle CR runs substantially along the center of the vehicle lane D1 are detected.

Also, the detecting unit 703 detects still target data items satisfying all of the following conditions (f1)) to (f3), from among the plurality of filter data items.

(f1)) A condition in which the longitudinal distance should be equal to or less than 120 m.

(f2) A condition in which the transverse distance should be equal to or less than 5.4 m.

(f3) A condition in which the transverse distance should be larger than 1.8 m.

According to the conditions (f1), (f2), and (f3) (which are grouped into a condition "F"), still target data items existing in front of the vehicle CR and existing in the right adjacent lane R2 in a case where the vehicle CR runs substantially along the center of the vehicle lane D1 are detected.

Also, the detecting unit 703 detects still target data items satisfying all of the following conditions (g1) to (g3), from among the plurality of filter data items.

(g1) A condition in which the longitudinal distance should be equal to or less than 120 m.

(g2) A condition in which the transverse distance should be less than −5.4 m.

(g3) A condition in which the transverse distance should be equal to or larger than −9.0 m.

According to the conditions (g1), (g2), and (g3) (which are grouped into a condition "G"), still target data items existing in front of the vehicle CR and existing in the leftmost lane L3 in a case where the vehicle CR runs substantially along the center of the vehicle lane D1 are detected.

Also, the detecting unit 703 detects still target data items satisfying all of the following conditions (h1) to (h3), from among the plurality of filter data items.

(h1) A condition in which the longitudinal distance should be equal to or less than 120 m.

(h2) A condition in which the transverse distance should be larger than 5.4 m.

(h3) A condition in which the transverse distance should be equal to or less than 9.0 m.

According to the conditions (h1), (h2), and (h3) (which are grouped into a condition "H"), still target data items existing in front of the vehicle CR and existing in the rightmost lane R3 in a case where the vehicle CR runs substantially along the center of the vehicle lane D1 are detected.

Thereafter, the determining unit 701 determines whether a surrounding-target absence flag of the current process is off. This surrounding-target absence flag is a flag which is turned off in a case where the number of still target data items detected on the basis of the above described conditions "D", "E", "F", "G", and "H" is equal to or less than a predetermined value (which is, for example, 1 under each condition), and is set to any one of an ON state and an OFF state for each data acquiring process, not for each specific target data item.

In a case where the surrounding-target absence flag of the previous process is off ("Yes" in STEP S302), in STEP S303, the determining unit 701 determines whether the number of still target data items detected in the predetermined range including the plurality of lanes in the surrounding-environment determining process of STEP S301 of the current process is equal to or less than a predetermined value (a first reference value), or not. The first reference value is, for example, a value in a case where the number of still target data items on each lane is 1. In a case where the number of still target data items detected in the predetermined range is equal to or less than the first reference value ("Yes" in STEP S303), in STEP S304, the determining unit 701 turns on the surrounding-target absence flag of the current process to be used in the subsequent surrounding-environment determining processes. Here, the case where the number of still target data items detected in the predetermined range is equal to or less than the first reference value means a case where the number of still target data items on each lane is equal to or less than a reference value set for the corresponding lane. Specifically, the first reference value is a value in a case where the number of still target data items of each of the vehicle lane D1, the left and right adjacent lanes L2 and R2, and the left and rightmost lanes L3 and R3 is 1. Meanwhile, in a case where the number of still target data items detected in the predetermined range exceeds the first reference value ("No" in STEP S303), the determining unit 701 finishes the process.

Returning to the process of STEP S302, in a case where the surrounding-target absence flag is on ("No" in STEP S302), in STEP S305, the determining unit 701 determines whether the number of still target data items detected in the predetermined range is equal to or larger than a second reference value, or not. Here, the case where the number of still target data items detected in the predetermined range is equal to or larger than the second reference value means a case where the number of still target data items on each lane is equal to or larger than a reference value set for the corresponding lane. Specifically, the second reference value is a value in a case where the number of still target data items of the vehicle lane D1 is 3, the number of still target data items of the left adjacent lane L2 is 2, the number of still target data items of the right adjacent lane R2 is 2, the number of still target data items of the leftmost lane L3 is 1, and the number of still target data items of the rightmost lane R3 is 1.

In a case where the number of still target data items detected in the predetermined range is equal to or larger than the second reference value ("Yes" in STEP S305), in STEP S306, the determining unit 701 turns off the surrounding-target absence flag. Meanwhile, in a case where the number of still target data items detected in the predetermined range is less than the second reference value ("No" in STEP S305), the determining unit 701 finishes the process.

Figure 18:
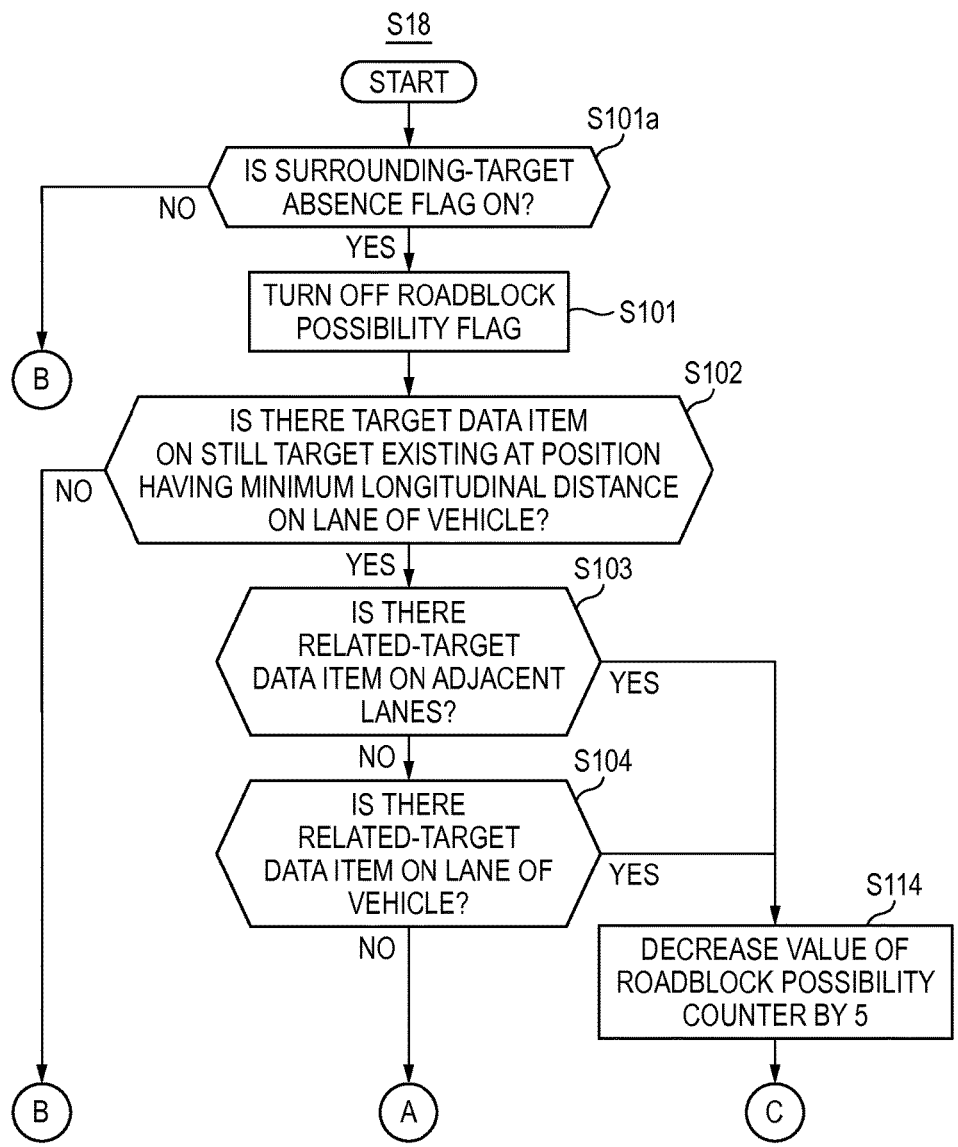
FIG. 18 is a flow chart of a roadblock determining process.
Figure 19:
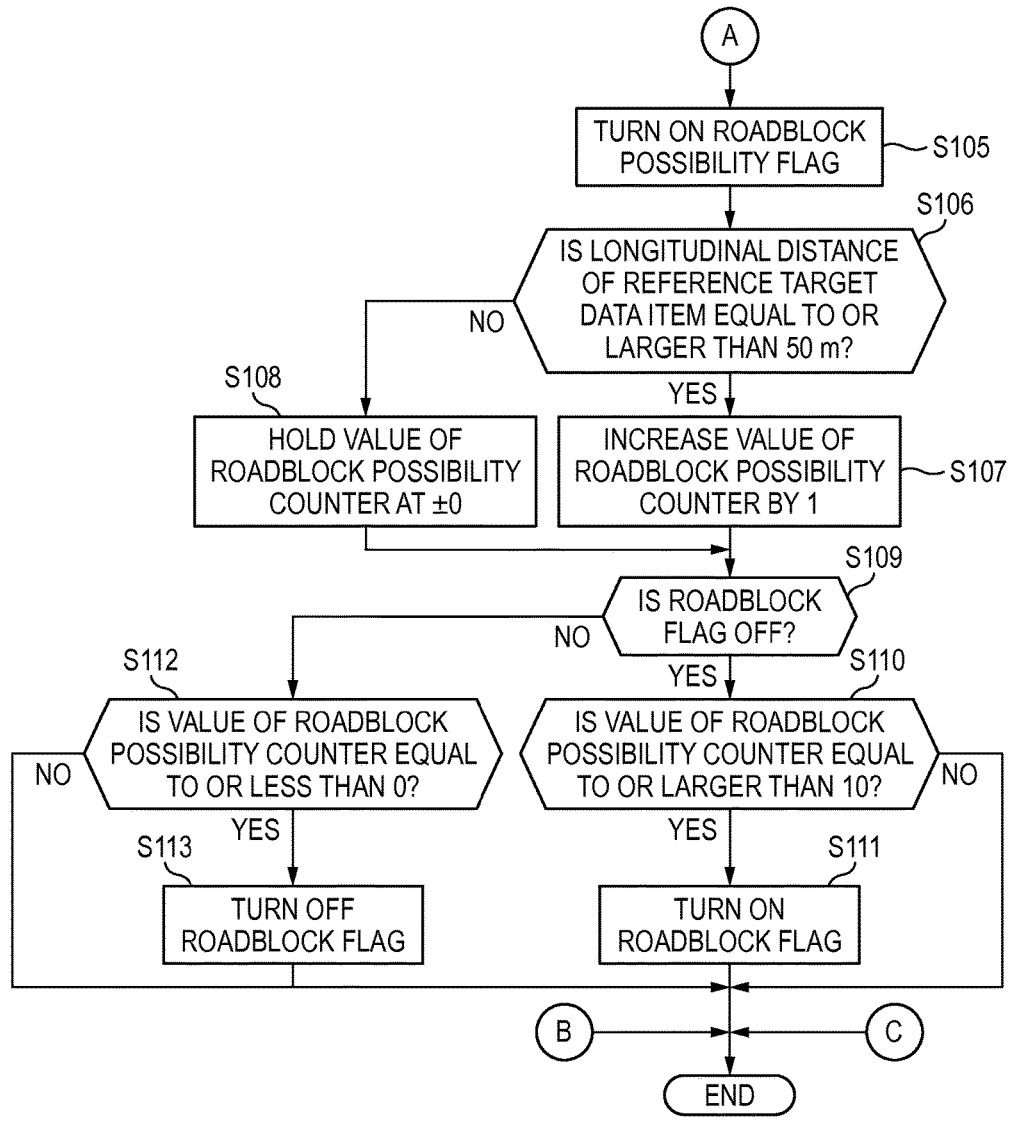
FIG. 19 is another flow chart of the roadblock determining process.

Subsequently, in STEP S101a of FIG. 18, the determining unit 701 determines whether the surrounding-target absence flag of the roadblock determining process shown in FIGS. 18 and 19 is on. Also, the determining unit 701 performs the determination of STEP S101a on the basis of whether the surrounding-target absence flag set in a past process (for example, the previous process) is on or off. In a case where the surrounding-target absence flag of the past process is on ("Yes" in STEP S101a), in STEP S101, the determining unit 701 turns off the roadblock possibility flags of the filter data items derived in the current process. Subsequently, processes identical to those described with respect to the first embodiment are performed. Meanwhile, in a case where the surrounding-target absence flag of the past process is off ("No" in STEP S101a), the determining unit 701 finishes the roadblock determining process.

As a result, in a case where the number of still target data items to cause the determining unit to erroneously determine roadblocks is relatively small, the determining unit 701 can perform the roadblock determining process, thereby performing accurate determination.

Third Embodiment

Now, a third embodiment will be described. The data processing unit 7 of the radar device 1 of the third embodiment changes ranges of the leftmost lane L3 and the rightmost lane R3 according to the speed of the vehicle CR in the surrounding-environment determining process (STEP S301 of FIG. 17) described with respect to the second embodiment.

The configuration and processes of the radar device 1 of the third embodiment are substantially identical to those of the first embodiment except that the ranges of the leftmost lane L3 and the rightmost lane R3 are changed according to the speed of the vehicle CR, and thus the process contents of the third embodiment is partially different from that of the first embodiment. Hereinafter, these differences will be mainly described with reference to FIGS. 20 to 21.

<9. Block Diagram of Radar Device>

Figure 20:
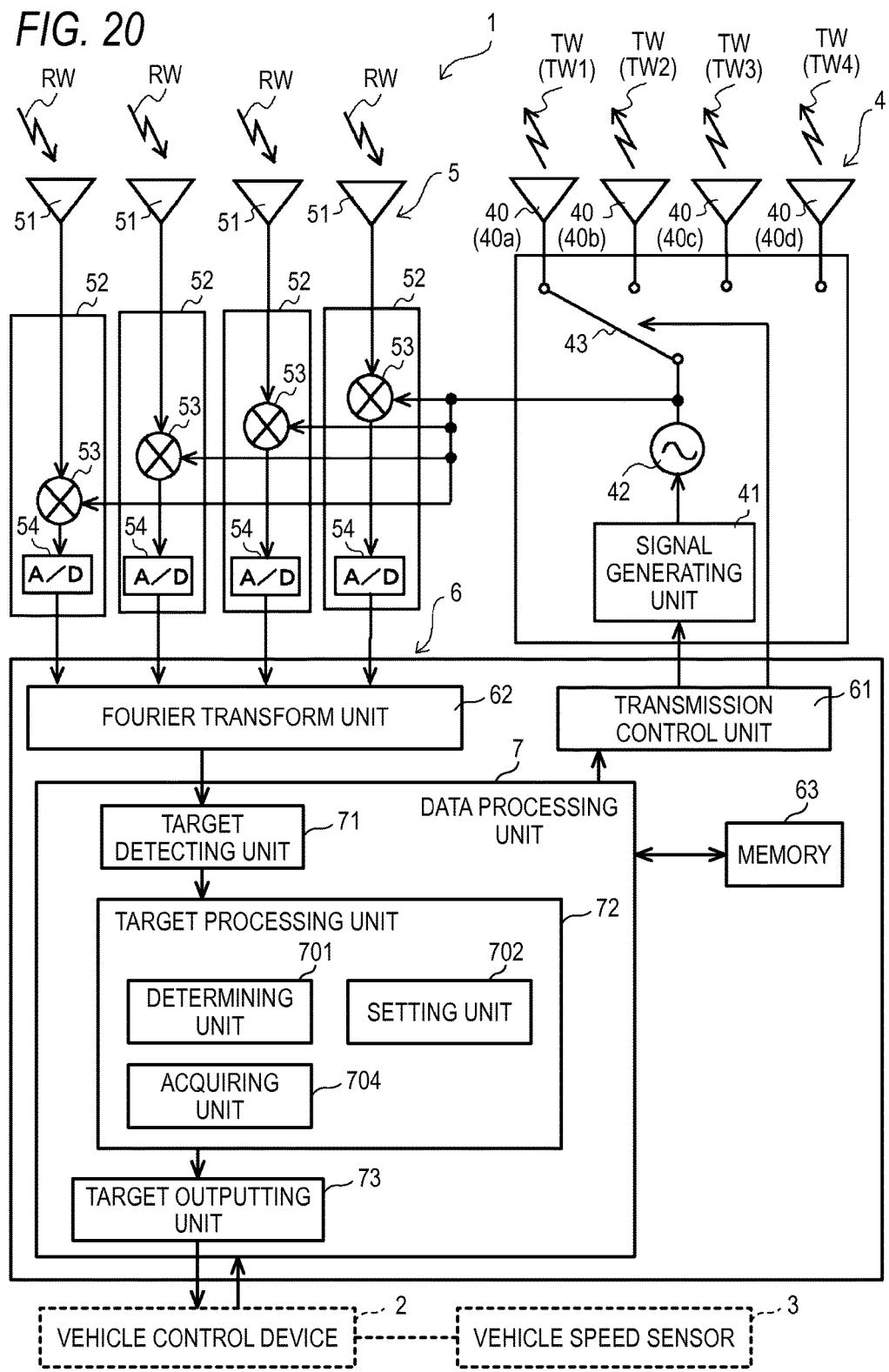
FIG. 20 is a view illustrating the configuration of a radar device of a third embodiment.

FIG. 20 is a view illustrating the configuration of the radar device 1 of the third embodiment. The data processing unit 7 of the radar device 1 includes an acquiring unit 704.

The acquiring unit 704 acquires the speed of the vehicle CR (referred to as the "vehicle speed") from the vehicle control device 2.

<10. Changing of Ranges>

Figure 21:
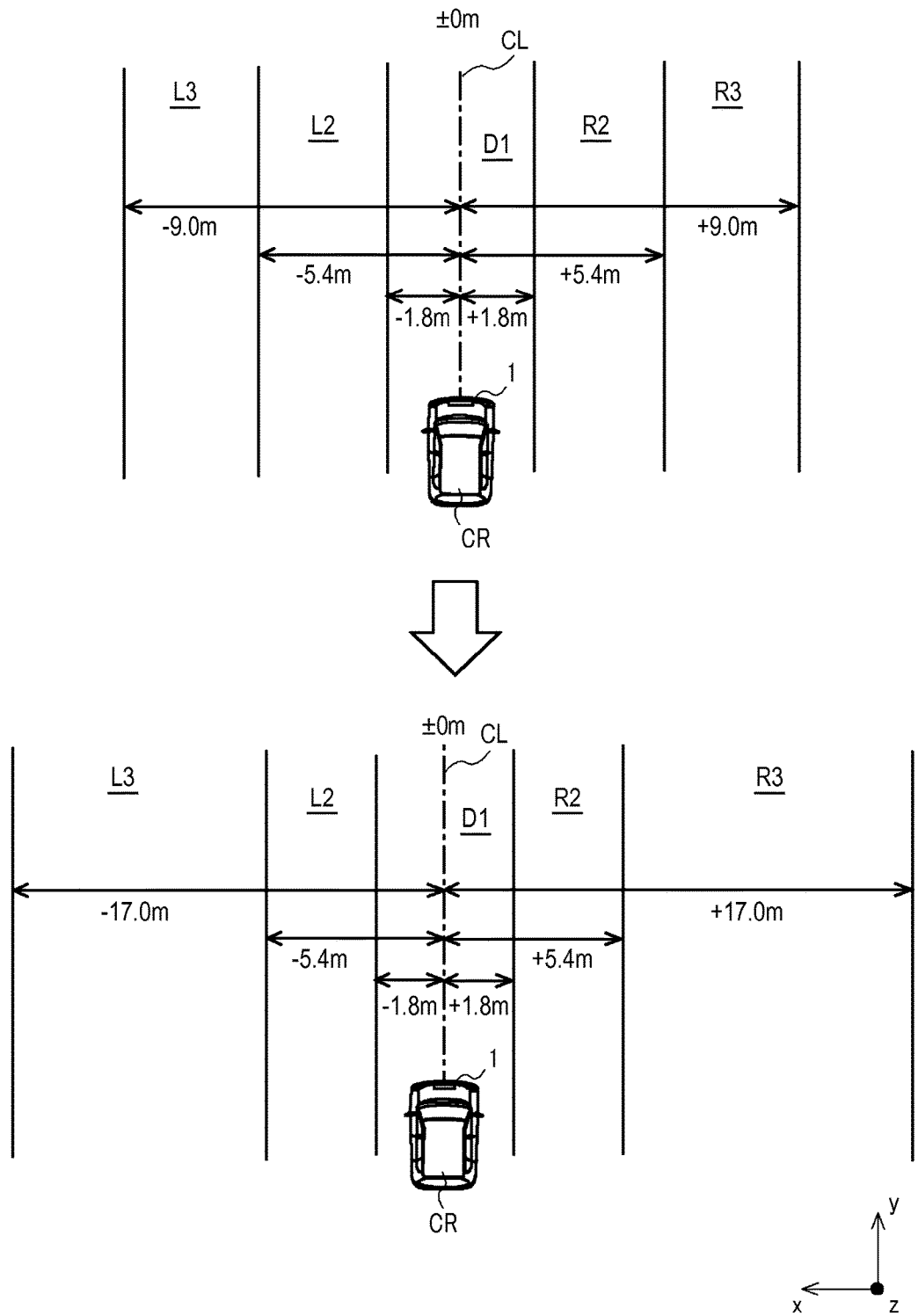
FIG. 21 is a view for explaining changing of a predetermined range according to the speed of a vehicle.

Subsequently, a specific example in which the ranges of the leftmost lane L3 and the rightmost lane R3 are changed according to the vehicle speed will be described with reference to FIG. 21. FIG. 21 is a view for explaining changing of predetermined ranges according to the vehicle speed.

The upper view of FIG. 21 shows predetermined ranges according to the individual conditions "D" to "H" of the second embodiment. The speed of the vehicle CR when each predetermined range is set is, for example, 40 km/h.

In contrast to this, in a case where the speed of the vehicle CR becomes 70 km/h faster than 40 km/h, the range (width) of the leftmost lane L3 and the range (width) of the rightmost lane R3 become wider than those when the vehicle speed is 40 km/h. In short, as the speed of the vehicle CR increases, the ranges of the leftmost lane L3 and the rightmost lane R3 widen, and thus the predetermined range which is the range including the plurality of lanes widens. As the speed of the vehicle CR decreases, the ranges of the leftmost lane L3 and the rightmost lane R3 narrow, and thus the predetermined range which is the range including the plurality of lanes narrows. In this way, the determining unit 701 changes the predetermined range including the plurality of lanes, according to the speed of the vehicle CR.

Specifically, in a case where the speed of the vehicle CR is 70 km/h, for example, the condition (g3) related to the leftmost lane L3 is as follows.

(g3) A condition in which the transverse distance should be equal to or larger than −17.0 m.

Also, for example, the condition (h3) related to the rightmost lane R3 is as follows.

(h3) A condition in which the transverse distance should be equal to or less than 17.0 m.

Like this, as the speed of the vehicle CR increases, the predetermined range including the plurality of lanes widens. Therefore, in a case where the speed of the vehicle CR is relatively high, it is possible to reduce a possibility that a still target data item which is not a roadblock will be determined as a data item on a roadblock, and prevent control such as sudden braking to hinder the safety of the user of the vehicle.

<Modifications>

Although the embodiments of the present invention have been described above, the present invention is not limited to the above described embodiments, and can be modified in various forms. Hereinafter, these modifications will be described. All forms including the above described embodiments and the following embodiments to be described below can be appropriately combined.

In each above described embodiment, with respect to determination conditions of filter data items which may be related-target data items, the determining process using the conditions (b1) to (b8) and the determining process using other conditions (c1) to (c7) have been described. In contrast to this, the determining unit 701 may perform determination on each filter data item which may be related-target data items, using the following other conditions (k1) to (k6).

(k1) A condition in which the moving-object flag should be off.

(k2) A condition in which the longitudinal distance should be equal to or less than 120 m.

(k3) A condition in which the transverse distance should be less than −5.8 m.

(k4) A condition in which the transverse distance should be equal to or larger than −15.0 m.

(k5) A condition in which the transverse distance should be larger than 5.8 m.

(k6) A condition in which the transverse distance should be equal to or less than 15.0 m.

(k7) The difference of the longitudinal distance of the filter data item from the longitudinal distance of the reference target data item should be equal to or less than −5.0 m.

According to the conditions (k1) and (k2), it is determined that the corresponding filter data item is a still target data item existing in front of the vehicle CR. According to the conditions (k3) to (k6), it is determined that the corresponding filter data item exists a range belonging to the same object with respect to the position of the reference target data item T1. Specifically, according to the conditions (k3) and (k4), it is determined whether the corresponding filter data item exists in a range including the leftmost lane L3 and a lane on the left of the leftmost lane L3. Also, according to the conditions (k5) and (k6), it is determined whether the corresponding filter data item exists in a range including the rightmost lane R3 and a lane on the right of the rightmost lane R3. According to the condition (k7), it is determined whether the corresponding filter data item is a data item which may belong to the same object as that of the reference target data item related to a roadblock, or a data item which may belong to the same object as that of the reference target data item related to an upper object.

In a case where all of the conditions (k1) to (k6), and (k7) are grouped into a condition "K", and all of the conditions (k1), (k2), and (k5) to (k7) are grouped into a condition "L", if a filter data item does not satisfy both conditions of the condition "K" and the condition "L", the determining unit 701 determines that any filter data item which may be a related-target data item relative to the reference target data item does not exist, and the corresponding reference target data item may be a filter data item related to a roadblock, and turns on the roadblock possibility flag of the corresponding reference target data item. Also, in a case where a filter data item satisfies all conditions of any one of the condition "K" or the condition "L", the determining unit decreases the value of a corresponding roadblock possibility counter by 5.

Also, in each above described embodiment, in the processes of STEPS S103 and S104, in a case where any related-target data item does not exist, it is determined that the corresponding conditions are satisfied ("No" in STEP S103, and "No" in STEP S104). In contrast to this, in the processes of STEPS S103 and S104, not only in a case where any related-target data item does not exist, but also in a case where the number of related-target data items is equal to or less than a predetermined value (for example, "1"), it may be determined that the corresponding conditions are satisfied.

Also, in each above described embodiment, the determining unit 701 performs the roadblock determining process on each filter data item. In contrast to this, the determining unit 701 may perform the roadblock determining process on each paired data item. The paired data items are paired data items of the current process which have been used in the filter process and have been stored in the memory 63. The determining unit 701 may read the paired data items of the current process from the memory 63 and perform the roadblock determining process on each paired data item. Further, the determining unit 701 may perform both or any one of the roadblock determining process on each filter data item and the roadblock determining process on each paired data item.

Also, in each above described embodiment, if a filter data has a confidence level of 90, the determining unit 701 turns on a corresponding output flag, and the target outputting unit 73 outputs the corresponding filter data item whose output flag is on, to the vehicle control device 2. In contrast to this, the target outputting unit 73 may output every filter data item to the vehicle control device 2. In this case, according to the confidence level of each filter data item, an index representing whether the corresponding filter data item is a roadblock is given to the corresponding filter data item, and on the basis of these indexes, the vehicle control device 2 determines whether each target data item is a target data item which is an object for vehicle control.

Also, in each above described embodiment, with respect to the ranges for detecting filter data items which may be related-target data items in STEP S103 of FIG. 9, the range of the left adjacent range AL is set to a range corresponding to the lane width of the left adjacent lane L2 which is equal to or larger than −5.4 m and less than −1.8 m in the horizontal distance, and the range of the right adjacent range AR is set to a range corresponding to the lane width of the right adjacent lane R2 which is larger than +1.8 m and equal to or less than +5.4 m in the horizontal distance. In contrast to this, the range of the left adjacent range AL may be set so as to include a portion of the range of the leftmost lane L3. For example, the left adjacent range AL may be set to a range which is equal to or larger than −5.8 m and less than −1.8 m in the horizontal distance. Also, the range of the right adjacent range AR may be set so as to include a portion of the range of the rightmost lane R3. For example, the right adjacent range AR may be set to a range which is larger than +1.8 m and equal to or less than +5.8 m in the horizontal distance.

Also, in the second embodiment, the first reference value is a value in a case where the number of still target data items on each lane is 1, and the second reference value is a value in a case where the number of still target data items of the vehicle lane D1 is 3, the number of still target data items of the left adjacent lane L2 is 2, the number of still target data items of the right adjacent lane R2 is 2, the number of still target data items of the leftmost lane L3 is 1, and the number of still target data items of the rightmost lane R3 is 1. In contrast to this, the first reference value may be any other value, for example, a value in a case where the number of still target data items on each lane is 0. Also, the second reference value may be any other value, for example, a value in a case where the number of still target data items on each lane is 2.

Also, in each above described embodiment, the number of transmitting antennae 40 of the radar device 1 is 4, and the number of receiving antennae 51 is 4. Theses numbers of transmitting antennae 40 and receiving antennae 51 of the radar device 1 are examples, and may be other numbers as long as it is possible to detect a plurality of target information items.

Also, in each above described embodiment, the radar device 1 is provided at the front portion (for example, the inside of the front bumper) of the vehicle. In contrast to this, the radar device 1 may be provided at one or more places of rear portions (for example, a rear bumper), left portions (for example, a left door mirror), and right portions (for example, a right door mirror) of the vehicle as long as it is possible to output a transmission wave from each corresponding place to the outside of the vehicle.

Also, in each above described embodiment, outputting from the transmitting antennae may use any method capable of detecting target information items, such as electric waves, ultrasonic waves, light, and lasers.

Also, in each above described embodiment, the radar device 1 may be used in other devices besides vehicles. For example, the radar device 1 may be used in an aircraft, a ship, and so on.

Also, in each above described embodiment, the speed of the vehicle CR is output from the vehicle speed sensor 3 to the vehicle control device 2. Therefore, the radar device 1 acquires the speed of the vehicle CR from the vehicle control device 2. In contrast to this, the radar device 1 may acquire the speed of the vehicle CR directly from the vehicle speed sensor 3.

Also, in each above described embodiment, various functions are implemented in a software wise by arithmetic processing of the CPU according to programs. However, some of those functions may be implemented by electric hardware circuits. Also, conversely, some of functions which are implemented by hardware circuits may be implemented in a software wise.

What is claimed is:

1. A radar device which receives reflected waves from objects, and derives still targets, comprising:
   a determining unit that determines whether any other still target exists at a position within a predetermined distance of a reference target which is a still target existing at a position closest to a position of a vehicle in a longitudinal direction; and
   a setting unit that enhances a reliability to determine the reference target as a roadblock, in a case where the number of other still targets existing at positions within the predetermined distance of the reference target is equal to or less than a predetermined value.

2. The radar device according to claim 1, wherein:
   in a case where the reference target exists in a range of a lane, defined by a lateral direction and a forward and backward direction, where the vehicle runs, if the number of other still targets existing in the ranges of adjacent lanes adjacent to the lane of the vehicle is equal to or less than the predetermined value, the setting unit enhances the reliability to determine the reference target as the roadblock.

3. The radar device according to claim 1, wherein:
in a case where the reference target exists in the range of a lane, defined by a lateral direction and a forward and backward direction, where the vehicle runs, if the number of other still targets existing at positions apart from the position of the vehicle by a predetermined distance or more in the longitudinal direction is equal to or less than a predetermined value, the setting unit enhances the reliability to determine the reference target as a roadblock.

4. The radar device according to claim 1, wherein:
in a case where the number of other still targets is equal to or less than the predetermined value, the setting unit increases a value of a confidence level which is an index for determining whether the reference target is the roadblock, by a predetermined value.

5. The radar device according to claim 1, wherein:
a detecting unit that detects still targets existing in a predetermined range, defined by a lateral direction and a forward and backward direction, including a plurality of lanes,
wherein, only in a case where it is determined in a current process that the number of still targets existing in the predetermined range is equal to or less than a predetermined value, in a subsequent process, the determining unit performs the determination.

6. The radar device according to claim 5, further comprising:
an acquiring unit that acquires a speed of the vehicle, wherein, in a case where the speed of the vehicle where the radar device is provided is equal to or larger than a predetermined value, the detecting unit widens a width of the predetermined range.

7. A radar device which receives reflected waves from objects, and derives still targets, and outputs target data items related to the still targets to a data using device which uses the target data items, comprising:
a determining unit that determines whether any other still target exists at a position within a predetermined distance of a reference target which is a still target existing at a position closest to a position of a vehicle in a longitudinal direction; and
an easing unit for reducing conditions that reduces an output condition for outputting a target data item related to the reference target to the data using device, in a case where the number of other still targets existing at positions within the predetermined distance of the reference target is equal to or less than a predetermined value.

8. A vehicle control system comprising:
the radar device according to claim 7.

9. A signal processing method of a radar device which receives reflected waves from objects, and derives still targets, comprising:
determining whether any other still target exists at a position within a predetermined distance of a reference target which is a still target existing at a position closest to a position of a vehicle in a longitudinal direction; and
enhancing a reliability to determine the reference target as a roadblock, in a case where the number of other still targets existing at positions within the predetermined distance of the reference target is equal to or less than a predetermined value.

* * * * *